(12) United States Patent
Zhang et al.

(10) Patent No.: US 12,327,507 B2
(45) Date of Patent: Jun. 10, 2025

(54) METHOD AND APPARATUS FOR DETERMINING GRAYSCALE DATA BY CALCULATING WEIGHTED VALUES, DEVICE, AND SCREEN DRIVE BOARD

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Shuo Zhang, Beijing (CN); Yanhui Xi, Beijing (CN); Tiankuo Shi, Beijing (CN); Xiaomang Zhang, Beijing (CN); Zhihua Ji, Beijing (CN); Yan Sun, Beijing (CN); Chenxi Zhao, Beijing (CN); Xiangjun Peng, Beijing (CN); Yifan Hou, Beijing (CN); Minglei Chu, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 318 days.

(21) Appl. No.: 17/795,088

(22) PCT Filed: Aug. 5, 2021

(86) PCT No.: PCT/CN2021/110837
§ 371 (c)(1),
(2) Date: Jul. 25, 2022

(87) PCT Pub. No.: WO2022/057495
PCT Pub. Date: Mar. 24, 2022

(65) Prior Publication Data
US 2023/0088891 A1 Mar. 23, 2023

(30) Foreign Application Priority Data
Sep. 16, 2020 (CN) .......................... 202010976058.5

(51) Int. Cl.
G09G 3/20 (2006.01)
G02F 1/1347 (2006.01)

(52) U.S. Cl.
CPC ......... *G09G 3/2007* (2013.01); *G02F 1/1347* (2013.01); *G09G 3/2096* (2013.01);
(Continued)

(58) Field of Classification Search
CPC ........ G09G 3/007; G09G 3/20; G09G 3/2007; G09G 3/2059; G09G 3/2092–2096;
(Continued)

(56) References Cited

U.S. PATENT DOCUMENTS

| 6,369,863 B1 * | 4/2002 | Smith | H04N 9/3185 |
| | | | 348/751 |
| 8,531,353 B2 * | 9/2013 | Heidrich | H04N 9/3126 |
| | | | 345/6 |

(Continued)

FOREIGN PATENT DOCUMENTS

WO WO-2020097930 A1 * 5/2020 ........... G06F 3/1423

*Primary Examiner* — Keith L Crawley
(74) *Attorney, Agent, or Firm* — Lippes Mathias LLP

(57) ABSTRACT

Provided is a method for determining grayscale data. The method for determining grayscale data includes acquiring a source image; acquiring pixel values of third pixel points by calculating weighted values of channel values of a first pixel point and channel values of second pixel points of corresponding colors; acquiring a first image by replacing pixel values of the second pixel points in the source image with the pixel values of the third pixel points; and determining grayscale data of the first panel and grayscale data of the second panel based on the first image.

17 Claims, 6 Drawing Sheets

(52) U.S. Cl.
CPC ... *G02F 2203/30* (2013.01); *G09G 2300/023* (2013.01); *G09G 2330/021* (2013.01)

(58) Field of Classification Search
CPC ........ G09G 2300/023; G09G 2320/028–0285; G09G 2330/021; G09G 2340/0464–0485; G09G 2340/10–12; G02F 1/1347
See application file for complete search history.

(56) References Cited

U.S. PATENT DOCUMENTS

| | | | |
|---|---|---|---|
| 9,584,784 B2* | 2/2017 | Shields | H04N 9/3161 |
| 11,852,921 B2* | 12/2023 | Xi | G02F 1/1323 |
| 2005/0264767 A1* | 12/2005 | Inazumi | H04N 9/3108 |
| | | | 353/69 |
| 2008/0136975 A1* | 6/2008 | Nishida | H04N 9/317 |
| | | | 348/E9.027 |
| 2010/0118006 A1* | 5/2010 | Kimura | G09G 3/3611 |
| | | | 348/673 |
| 2010/0253863 A1* | 10/2010 | Harding | H04N 9/3126 |
| | | | 348/E5.137 |
| 2021/0217371 A1* | 7/2021 | Guo | G09G 3/3607 |

* cited by examiner

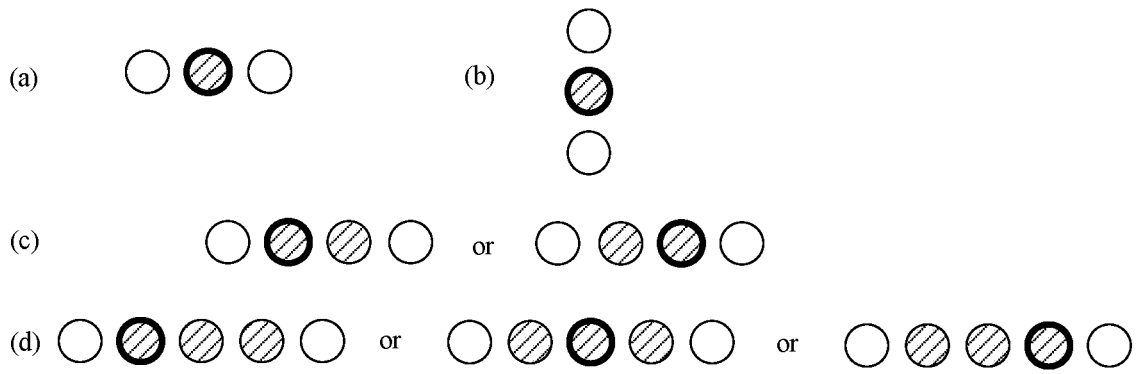
FIG. 10
| 0 | 0 | 0 | 0 | 0 | 0 | 0 | 0 | 0 | 0 | 0 | ... |
|---|---|---|---|---|---|---|---|---|---|---|---|
| 0 | 0 | S11 | S12 | S13 | S14 | S15 | S16 | S17 | S18 | S19 | ... |
| 0 | 0 | S21 | S22 | S23 | S24 | S25 | S26 | S27 | S28 | S29 | ... |
| 0 | 0 | S31 | S32 | S33 | S34 | S35 | S36 | S37 | S38 | S39 | ... |
| 0 | 0 | S41 | S42 | S43 | S44 | S45 | S46 | S47 | S48 | S49 | ... |
| ... | ... | ... | ... | ... | ... | ... | ... | ... | ... | ... | ... |
FIG. 11
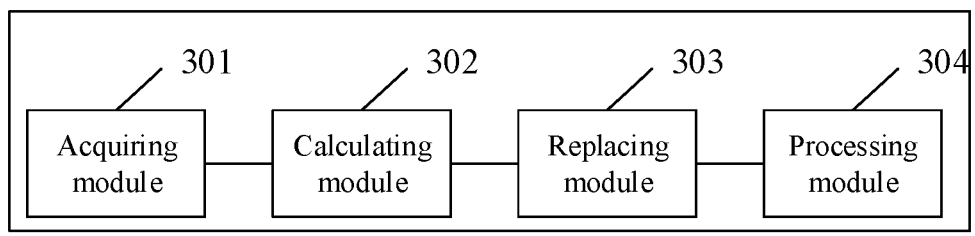
FIG. 12

METHOD AND APPARATUS FOR DETERMINING GRAYSCALE DATA BY CALCULATING WEIGHTED VALUES, DEVICE, AND SCREEN DRIVE BOARD

CROSS-REFERENCE TO RELATED APPLICATION

This application is a 371 of PCT application No. PCT/CN2021/110837, filed on Aug. 5, 2021, which claims priority to Chinese Patent Application No. 202010976058.5, filed on Sep. 16, 2020 and entitled "METHOD OF AND APPARATUS FOR DETERMINING GRAYSCALE DATA, DEVICE, AND SCREEN DRIVE BOARD," the disclosures of which are incorporated herein by references in their entireties.

TECHNICAL FIELD

The present disclosure relates to the field of display technologies, and in particular, relates to a method and apparatus for determining grayscale data, a device, and a screen drive board.

BACKGROUND

Screen stacking refers to a scheme in which an upper panel and a lower panel are stacked for display. The upper panel is a color screen, and focuses on precise color control and faithfully restores colors. The lower panel is a monochrome screen, and focuses on fine dimming and shows high contrast and dark field details.

SUMMARY

Embodiments of the present disclosure provide a method and apparatus for determining grayscale data, a device, and a screen drive board. The technical solutions are summarized as follows.

In one aspect, a method for determining grayscale data is provided. The method is applicable to a stacking-screen display device, wherein the stacking-screen display device includes a first panel and a second panel that are stacked, the first panel including primary pixels, the second panel including secondary pixels, and an orthographic projection of a first edge, on a display face of the second panel, of the first panel is outside the display face of the second panel. The method includes:
  acquiring a source image, wherein the source image includes a plurality of pixel points;
  acquiring pixel values of third pixel points by calculating weighted values of channel values of a first pixel point and channel values of second pixel points of corresponding colors, wherein the first pixel point is a pixel point, which corresponds to the first edge, in the source image, and the second pixel points are pixel points, which are adjacent to the first pixel point, in the source image;
  acquiring a first image by replacing pixel values of the second pixel points in the source image with the pixel values of the third pixel points; and
  determining grayscale data of the first panel and grayscale data of the second panel based on the first image, wherein the grayscale data of the first panel includes grayscale values of the primary pixels, and the grayscale data of the second panel includes grayscale values of the secondary pixels.

Optionally, calculating the weighted values of the channel values of the first pixel point and the channel values of the second pixel points of the corresponding colors includes:
  determining a weight of the first pixel point and weights of the second pixel points based on a misalignment size of screen stacking, wherein the greater the misalignment size of screen stacking, the less the weight of the first pixel point, and the greater the weights of the second pixel points, the misalignment size of screen stacking indicates a number of arrays of the primary pixels whose orthographic projections are outside the display face of the second panel, and an arrangement direction of the arrays of the primary pixels is parallel to the first edge of the first panel; and
  calculating the weighted values of the channel values of the first pixel point and the channel values of the second pixel points of the corresponding colors based on the weight of the first pixel point and the weights of the second pixel points.

Optionally, a number of arrays of the second pixel points is equal to a number of arrays of the third pixel points; and
  weights for calculating pixel values of the third pixel points in different arrays are different in the case that the number of arrays of the third pixel points is greater than t.

Optionally, the method further includes:
  displaying a first pattern at a first position on the first panel;
  displaying a second pattern at a second position on the second panel, wherein the first position is at least partially opposite to the second position in the case that the first panel and the second panel are not misaligned; and
  determining the misalignment size of screen stacking of the first panel and the second panel based on luminance of the first pattern.

Optionally, determining the grayscale data of the second panel based on the first image includes:
  acquiring first grayscale data of the second panel by extracting a maximum grayscale of three channels of the pixel points from the first image;
  acquiring second grayscale data of the second panel by shifting the first grayscale data based on a misalignment size of screen stacking, wherein the greater the misalignment size of screen stacking, the more the shifting, and the misalignment size of screen stacking indicates a number of arrays of the primary pixels whose orthographic projections are outside the display face of the second panel; and
  acquiring third grayscale data of the second panel by calculating a weighted value of the grayscale values of each of the secondary pixels and its surrounding secondary pixels based on the second grayscale data.

Optionally, acquiring the second grayscale data of the second panel by shifting the first grayscale data based on the misalignment size of screen stacking includes:
  determining the first edge with the misalignment size of screen stacking greater than or equal to one array of primary pixels; and
  translating the first grayscale data along a direction toward the first edge, wherein the magnitude of the shifting is equal to an integer part of the misalignment size of screen stacking.

Optionally, translating the first grayscale data along the direction toward the first edge includes:
  adding at least one array of data bits ahead a first array of the first grayscale data;

translating the first grayscale data along the direction toward the first edge, such that the at least one array of data bits is filled, and at least one array of data bits is vacated at the end of the first grayscale data; and filling the at least one array of data bits vacated at the end of the first grayscale data with at least one array of data at the end of the first grayscale data.

Optionally, resolutions of the first panel and the second panel are equal; and acquiring the third grayscale data of the second panel by calculating the weighted value of the grayscale values of each of the secondary pixels and its surrounding secondary pixels based on the second grayscale data includes:

determining the second grayscale data as grayscale data to be calculated; and acquiring the third grayscale data by calculating a weighted value of a grayscale mean value corresponding to the secondary pixels and a maximum grayscale value corresponding to the secondary pixels in the grayscale data to be calculated, wherein the grayscale mean value corresponding to the secondary pixels indicates a grayscale mean value of a plurality of first secondary pixels within a first range of the secondary pixels, and the maximum grayscale value corresponding to the second secondary pixels indicates a maximum grayscale value of a plurality of second secondary pixels within a second range of the secondary pixels; wherein the first range and the second range are same or different; and at least one of the first secondary pixels is overlapped with the second secondary pixels, or none of the first secondary pixels is overlapped with the second secondary pixels.

Optionally, resolutions of the first panel and the second panel are not equal; and acquiring the third grayscale data of the second panel by calculating the weighted value of the grayscale values of each of the secondary pixels and its surrounding secondary pixels based on the second grayscale data includes:

acquiring grayscale data to be calculated by calculating a weighted value of a grayscale mean value and a maximum value of the plurality of the primary pixels affected by the secondary pixels; and acquiring the third grayscale data by calculating a weighted value of a grayscale mean value corresponding to the secondary pixels and a maximum grayscale value corresponding to the secondary pixels in the grayscale data to be calculated, wherein the grayscale mean value corresponding to the secondary pixels indicates a grayscale mean value of a plurality of first secondary pixels within a first range of the secondary pixels, and the maximum grayscale value corresponding to the secondary pixels indicates a maximum grayscale value of a plurality of second secondary pixels within a second range of the secondary pixels; wherein the first range and the second range are same or different; and at least one of the first secondary pixels is overlapped with the second secondary pixels, or none of the first secondary pixels is overlapped with the second secondary pixels.

Optionally, calculating the weighted value of the grayscale mean value corresponding to the secondary pixels and the maximum grayscale value corresponding to the secondary pixels in the grayscale data to be calculated includes:

filtering the secondary pixels within the first range of the secondary pixels by a first filter, and selecting and calculating the grayscale mean value of the plurality of first secondary pixels;

filtering the secondary pixels within the second range of the secondary pixels by a second filter, and selecting and determining the maximum grayscale value of the plurality of second secondary pixels; and calculating the weighted value of the grayscale mean value of the plurality of first secondary pixels and the maximum grayscale value of the plurality of second secondary pixels.

Optionally, both the first filter and the second filter have a size of 3*3.

Optionally, determining the grayscale data of the second panel based on the first image further includes:

acquiring a grayscale mapping table; and mapping the third grayscale data into fourth grayscale data by the grayscale mapping table;

wherein grayscale values in the fourth grayscale data are not less than corresponding grayscale values in the third grayscale data in the case that resolutions of the first panel and the second panel are equal; and the grayscale values in the fourth grayscale data are not less than the corresponding grayscale values in the third grayscale data in the case that the resolutions of the first panel and the second panel are not equal, and the grayscale values are greater than a threshold.

Optionally, in the grayscale mapping table, the grayscale values in the third grayscale data are organized into a plurality of consecutive first ranges, and the grayscale values in the fourth grayscale data are organized into a plurality of consecutive second ranges that are in one-to-one correspondence with the plurality of first ranges; and mapping the third grayscale data into the fourth grayscale data by the grayscale Wrapping table includes:

determining the grayscale mapping table based on the resolutions of the first panel and the second panel;

determining the first ranges of the grayscale values in the third grayscale data in the grayscale mapping table;

determining the second ranges corresponding to the first ranges in the gray scale mapping table; and determining the grayscale values in the fourth grayscale data corresponding to the grayscale values in the third grayscale data by performing linear interpolation based on endpoints of the determined second ranges.

Optionally, the resolution of the first panel is 4K or 8K, and the resolution of the second panel is 4K; and the corresponding grayscale mapping tables are different in the case that the first panel has different resolutions.

Optionally, determining the grayscale data of the second panel based on the first image further includes:

detecting, based on the fourth grayscale data, whether the second panel includes an abnormal secondary pixel, wherein the abnormal secondary pixel is displayed as a bright line or a dark line; and acquiring compensated fourth grayscale data by compensating the fourth grayscale data based on the grayscale values of secondary pixels on both sides of the abnormal secondary pixel in the case that the second panel includes the abnormal secondary pixel.

Optionally, detecting, based on the fourth grayscale data, whether the second panel includes the abnormal secondary pixel includes:

determining, based on grayscale values of a secondary pixel to be detected and its adjacent secondary pixels, whether the secondary pixel to be detected is displayed as a single-pixel bright line, a double-pixel bright line, or a tri-pixel bright line; and determining, based on the grayscale values of the secondary pixel to be detected and its adjacent secondary pixels, whether the secondary pixel to be detected is displayed as a single-pixel dark line, a double-pixel dark line, or a tri-pixel dark line.

Optionally, determining the grayscale data of the first panel based on the first image includes:

acquiring fifth grayscale data by determining weighted grayscale values of a set of the secondary pixels corresponding to the primary pixels based on the grayscale data of the second panel; and determining the grayscale data of the first panel based on the fifth grayscale data and the first image.

In one aspect, an apparatus for determining grayscale data is provided. The apparatus is applicable to a stacking-screen display device, wherein the stacking-screen display device includes a first panel and a second panel that are stacked, wherein the first panel includes primary pixels, the second panel includes secondary pixels, and an orthographic projection of a first edge, on a display face of the second panel, of the first panel is outside the display face of the second panel. The apparatus includes:

an acquiring module, configured to acquire a source image, wherein the source image includes a plurality of pixel points;

a calculating module, configured to acquire pixel values of third pixel points by calculating weighted values of channel values of first pixel point and channel values of second pixel points of corresponding colors, wherein the first pixel point is a pixel point, which corresponds to the first edge, in the source image, and the second pixel points are pixel points, which are adjacent to the first pixel point, in the source image;

a replacing module, configured to acquire a first image by replacing pixel values of the second pixel points in the source image with the pixel values of the third pixel points; and a processing module, configured to determine grayscale data of the first panel and grayscale data of the second panel based on the first image, wherein the grayscale data of the first panel includes grayscale values of the primary pixels, and the grayscale data of the second panel includes grayscale values of secondary pixels.

In an aspect, a computer device is provided. The computer device includes a processor and a memory; wherein the memory is configured to store a computer program; and the processor, when running the computer program stored in the memory, is configured to perform the method for determining the grayscale data according to any one of the preceding aspects.

In one aspect, a non-transitory computer-readable storage medium is provided. The non-transitory computer-readable storage medium stores one or more computer instructions therein, wherein the one or more stored computer instructions, when executed by a processor, cause the processor to perform the method for determining the grayscale data according to any one of the preceding aspects.

In an aspect, a screen drive board is provided. The screen drive board includes:

a timing controller, configured to determine the grayscale data of the first panel and the grayscale data of the second panel based on a source image by the method according to any one of the above aspects, and generate a timing control signal of the first panel and a timing control signal of the second panel;

a voltage conversion circuit, configured to generate a reference voltage signal and a row drive signal based on a power supply; and a grayscale voltage generation circuit, connected to the voltage conversion circuit, and configured to generate, based on the reference voltage signal, grayscale voltages required by grayscales of primary pixels of the first panel and secondary pixels of the second panel;

wherein the timing control signal of the first panel and the row drive signal are supplied to a row drive circuit of the first panel, and the timing control signal of the second panel and the row drive signal are supplied to a row drive circuit of the second panel; the grayscale data of the first panel, the timing control signal of the first panel, and the grayscale voltages required by the grayscales of the primary pixels of the first panel are supplied to a column drive circuit of the first panel; and the grayscale data of the second panel, the timing control signal of the second panel, and the grayscale voltages required by the grayscales of the secondary pixels of the second panel are supplied to a column drive circuit of the second panel.

BRIEF DESCRIPTION OF THE DRAWINGS

For clear description of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 8 to FIG. 10 are schematic diagrams of the detection of an abnormal secondary pixel according to an embodiment of the present disclosure;

FIG. 11 is a schematic diagram of a filter according to an embodiment of the present disclosure;

FIG. 12 is a block diagram of an apparatus for determining grayscale data according to an embodiment of the present disclosure;

DETAILED DESCRIPTION

For clearer descriptions of the objectives, technical schemes, and advantages of the present disclosure, the embodiments of the present disclosure are described in detail hereinafter in combination with the accompanying drawings.

An embodiment of the present disclosure provides a method for determining grayscale data. The method is applicable to a stacking-screen display device. In order to introduce the method provided in this embodiment, the structure of a stacking-screen display device is described briefly hereinafter.

Figure 1:
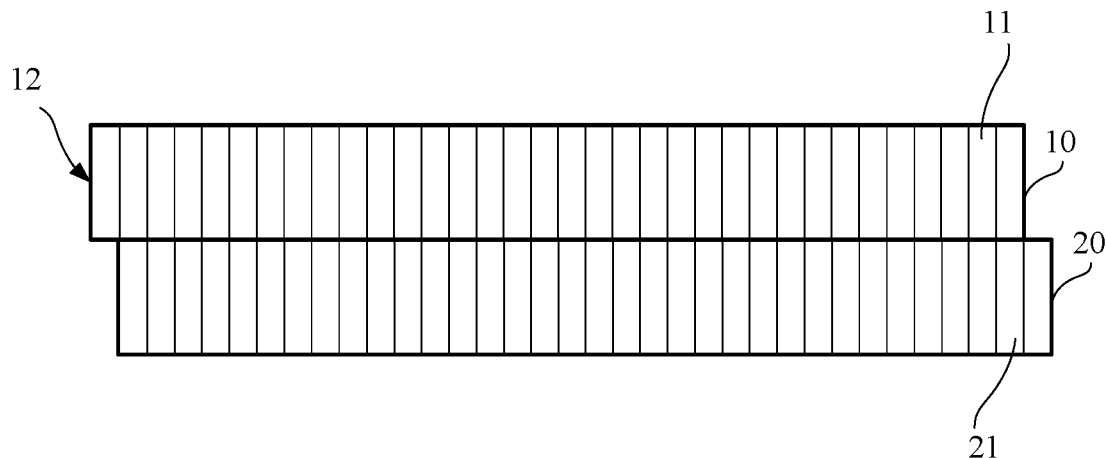
FIG. 1 is a schematic structural diagram of a stacking-screen display device according to an embodiment of the present disclosure.

FIG. 1 is a schematic structural diagram of a stacking-screen display device according to an embodiment of the present disclosure. Referring to FIG. 1, the stacking-screen display device includes a first panel 10 and a second panel 20 that are stacked. The first panel 10 includes primary pixels 11, and the second panel 20 includes secondary pixels 21. An orthographic projection of the first edge 12, on a display face of the second panel 20, of the first panel 10 is outside the display face of the second panel 20. The display face of the second panel 20 is a light-emitting face of the second panel, that is, a face of the second panel that faces towards the first panel.

The first panel 10 is an upper panel or a primary panel. The upper panel is a color panel, and focuses on precise color control and faithfully restores colors. The second panel 20 is a lower panel or a secondary panel. The lower panel is a monochrome panel, and focuses on fine dimming and shows high contrast and dark field details.

Taking a stacking-screen display device fabricated by a liquid crystal display technology as an example, the upper panel may include an array substrate, a liquid crystal layer, and a color filter layer, and the lower panel may include an array substrate and a liquid crystal layer.

In the stacking-screen display device, resolutions of the first panel 10 and the second panel 20 may be equal. For example, in a 4K4K stacking-screen display device, the resolutions of the first panel 10 and the second panel 20 are both 4K, that is, 3840*2160. The resolutions of the first panel 10 and the second panel 20 may also be different. For example, in an 8K4K stacking-screen display device, the resolution of the first panel 10 is 8K (7680*4320), and the resolution of the second panel 20 is 4K.

For a stacking-screen, there is a problem of alignment accuracy. In the case that the first panel and the second panel are misaligned, pixels on an edge of the first panel may lack backlight, thereby causing the failure of normal display.

Figure 2:
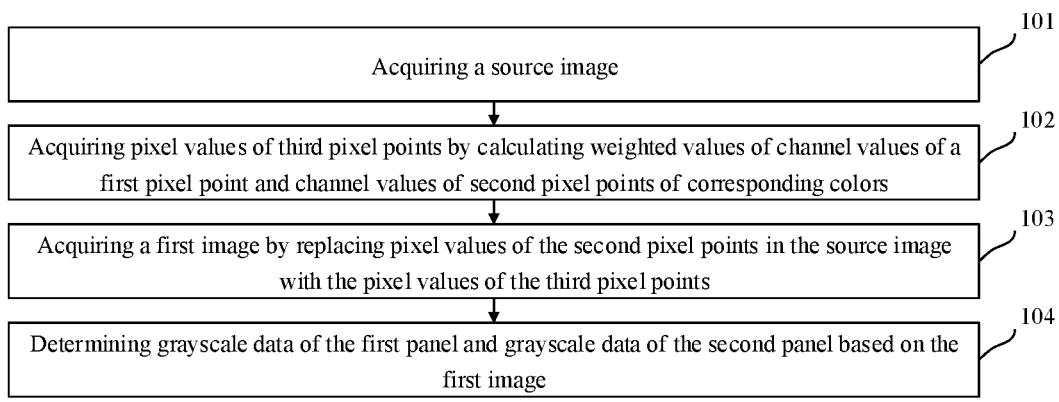
FIG. 2 is a flowchart of a method for determining grayscale data according to an embodiment of the present disclosure.

FIG. 2 is a flowchart of a method for determining grayscale data according to an embodiment of the present disclosure. Referring to FIG. 2, the method includes the following steps.

In S101, a source image is acquired.

The source image includes a plurality of pixel points, and a number of the pixel points in the source image is generally equal to a number of primary pixels in a first panel. Each pixel point includes a plurality of channels. For example, each pixel includes red (R), green (G) and blue (B) channels, which correspond to three sub-pixels of one primary pixel in a display panel.

Figure 3:
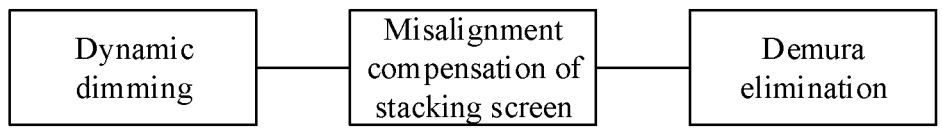
FIG. 3 is a schematic diagram of an opportunity of performing a method for determining grayscale data according to an embodiment of the present disclosure.

The method in the embodiments of the present disclosure may be performed by a controller of a stacking-screen display device. For example, the method may be designed as a module with an intellectual property (IP) algorithm to form a digital IP core integrated in the controller. FIG. 3 is a schematic diagram of an opportunity of performing the method for determining grayscale data according to the embodiments of the present disclosure. Referring to FIG. 3, the method may be performed after dynamic dimming and Demura elimination are performed on the stacking-screen display device. It should be noted that misalignment compensation of a stacking-screen, the dynamic dimming and the Demura elimination may be achieved by different IP cores, and the stacking-screen display device may also perform other image processing in addition to the above processing, which is not limited in the present disclosure.

The controller of the stacking-screen display device acquires the source image output by other device (such as a computer) to the stacking-screen display device.

In S102, pixel values of third pixel points are acquired by calculating weighted values of channel values of a first pixel point and channel values of the second pixel points of corresponding colors.

The pixel value of each pixel point includes channel values of the channels. The channel value of each channel, that is, a grayscale value of the channel, is configured to control a grayscale of a corresponding sub-pixel in the panel. The pixel value of each pixel point is configured to control a grayscale of one pixel in the panel.

The first pixel point is pixel point, which corresponds to a first edge, in the source image, and the second pixel points are pixel points, which are adjacent to the first pixel point, in the source image.

In the case that the first panel and the second panel are misaligned, the primary pixels on an edge of the first panel cannot receive light from the second panel (which may be taken as backlight of the first panel), thereby causing the failure of the display of the part of the primary pixels in the first panel.

For example, the first edge is a left or right edge of the first panel, which corresponds to at least one column of pixel points in the source image, that is, pixel points displayed on at least one column of pixels within the edge of the first panel. The pixel points in the at least one column of pixel points are the first pixel points, and the pixel points in a column adjacent to the at least one column of pixel points are the second pixel points. The adjacent column may be one or more columns. In the case that the weighted value is calculated, the first pixel points and the second pixel points in the same array may be subjected to weighted calculation, and a weighted value of a red channel, a weighted value of a green channel, and a weighted value of a blue channel are calculated, and the calculated weighted values of the three channels constitute pixel values of the third pixel points.

In the case that the first edge is an upper or lower edge of the first panel, the first edge corresponds to at least one row of pixel points in the source image, that is, pixel points displayed on at least one row of pixels within the edge of the first panel. The pixel points in a row adjacent to the at least one row of pixel points are the second pixel points. The first pixel points and the second pixel points in the same column may be subjected to weighted calculation to calculate the weighted values.

In S103, a first image is acquired by replacing pixel values of the second pixel points in the source image with the pixel values of the third pixel points.

In S102 and S103, the problem that the primary pixels on the edge in the first panel cannot be displayed is solved by weighting and replacing the pixel values of the pixel points.

In S104, grayscale data of the first panel and grayscale data of the second panel are determined based on the first image.

The grayscale data of the first panel includes grayscale values of the primary pixels, and the grayscale data of the second panel includes grayscale values of the secondary pixels.

The first edge cannot be displayed normally in the case that the stacking-screen is misaligned. In the embodiments of the present disclosure, the pixel values of the pixel points corresponding to the first edge and the adjacent pixel points in the source image are weighted, and then the pixel values of the adjacent pixel points are replaced with the weighted values. Therefore, the pixels close to the first edge can display the weighted values in display of the panel, such that the content displayed close to the edge of the first edge may include both the pixel points corresponding to the first edge and the adjacent pixel points in the case that the pixels of the first edge cannot be displayed normally, that is, the pixel points corresponding to the first edge are compressed into adjacent arrays of pixel points for display in the stacking-screen display device. One array refers to one row or one column. Therefore, the problem that the content of the pixel points corresponding to the first edge is lost due to the misalignment of the screen stacking is avoided. In addition, in the case that the pixel values of the pixel points are replaced, the grayscale data of the upper and lower panels is determined based on a replaced image, such that the upper and lower panels are driven to emit light for display. These solutions are not limited by the resolutions of the upper and lower panels, and are applicable to stacking-screens of various resolutions.

Figure 4:
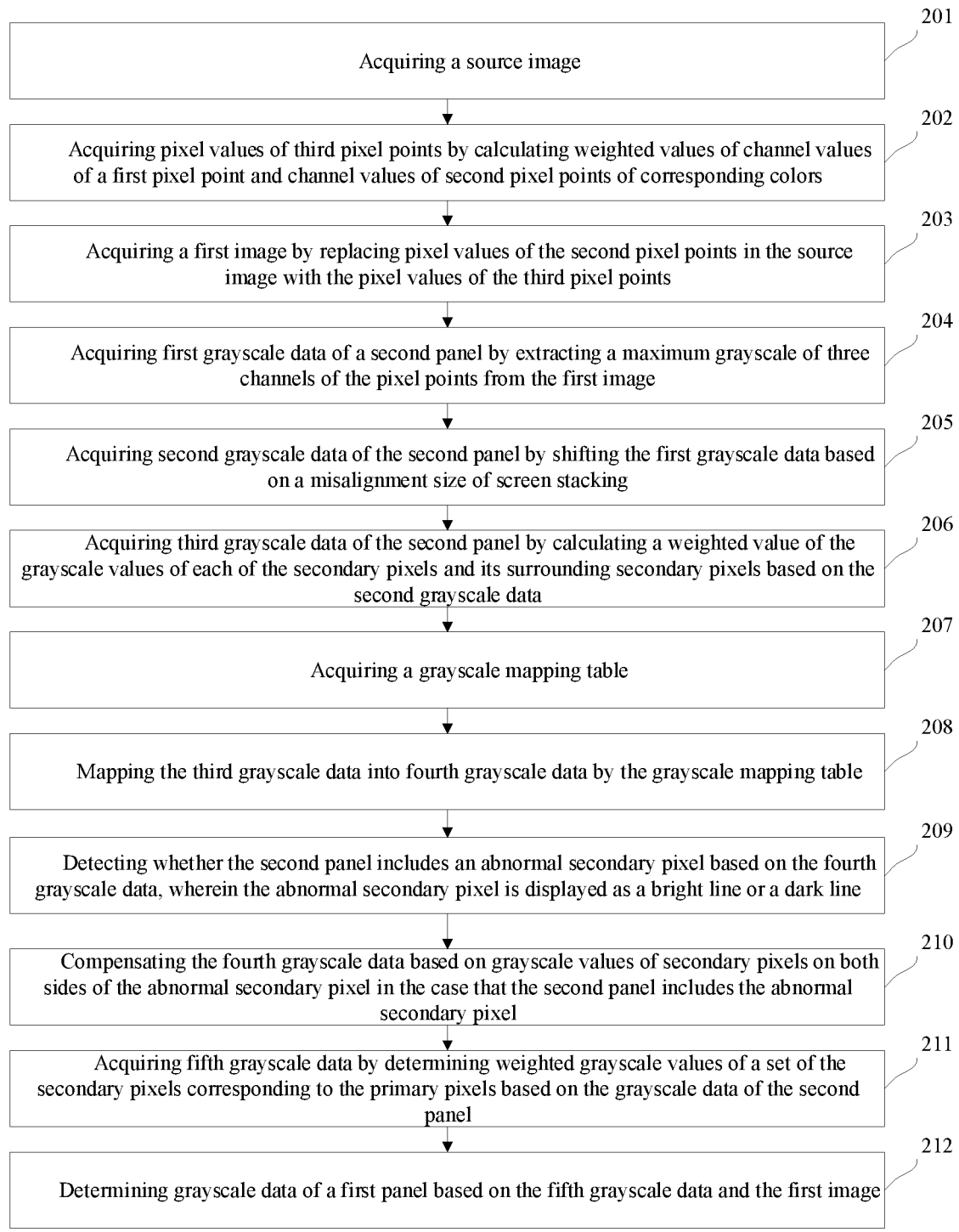
FIG. 4 is a flowchart of a method for determining grayscale data according to an embodiment of the present disclosure.

FIG. 4 is a flowchart of a method for determining grayscale data according to an embodiment of the present disclosure. Referring to FIG. 4, the method includes the following steps.

In S201, a source image is acquired.

The source image includes a plurality of pixel points, and the number of the pixel points in the source image is generally equal to the number of primary pixels in the first panel. Each pixel includes a plurality of channels. For example, each pixel includes red (R), green (G) and blue (B) channels, which correspond to three sub-pixels of one primary pixel in a display panel.

The method in the embodiments of the present disclosure may be performed by a controller of a stacking-screen display device. The controller of the stacking-screen display device acquires a source image output by other device (e.g., a computer) to the stacking-screen display device.

Illustratively, each channel of each pixel point in the source image may be represented by a plurality of bits, such as 10 bit or 8 bit, and the number of bits of each channel may be used to represent the precision of the source image. For example, the source image may be referred to as 10 bit or 8 bit. Different numbers of bits represent different levels of displayed colors. 8 bit represents 256 grayscales, and 10 bit represents 1024 grayscales. In the case that the number of grayscale levels is greater, the colors are finer, and color transition is smoother. Through color mixing of three primary RGB colors, 8 bit can achieve 16.7 M colors, and 10 bit can achieve 1.07 billion colors.

For compatibility of source images of various numbers of bits, the method in the embodiments of the present disclosure may further include: compensating bits to the end of each channel in the case that the number of bits of the source image is less than n bits to reach n bits. Therefore, the method is applicable to the processing of source images of n bits and less than n bits.

For example, in the case that the number of bits of the source image is less than 10 bits, bits are compensated to the end of each channel to reach 10 bits. For example, in the case that the source image is 8 bit, two bits are compensated to the end of each channel to acquire a 10 bit image.

Illustratively, in the case that the source image is acquired, the numbers of bits of the channels of the pixel points in the source image is detected first, and a mode corresponding to the numbers of bits of the source image is then output. For example, the source image generally has two modes:

Mode_In=0: the source image is 10 bit, in which the numbers of bits of the source image are not necessary to be processed; and Mode_In=1: the source image is 8 bit, in which two bits are compensated to the end of each channel. When two bits are compensated, a size of 8 bit of each channel may be detected first, and values of the compensated two bits are determined based on the ranges of 8 bit of each channel in Table 1. Table 1 is shown as follows.

TABLE 1

| Grayscale value range of 8bit | Values of compensated two bits |
| --- | --- |
| 0 to d1 | Compensate 00 |
| d1 + 1 to d2 | Compensate 01 |
| d2 + 1 to d3 | Compensate 10 |
| d3 + 1 to 255 | Compensate 11 |

Both d1, d2, d3 may be distributed within 0 to 255. According to the above compensating mode, the compensated 10 bit data include a maximum value of 1023, a minimum value of 0, and some values between 0 and 1023. Therefore, in the subsequent process, the richness of data is equivalent to the 10 bit source image, which ensures a final processing effect.

In S202, pixel values of third pixel points are acquired by calculating weighted values of the channel values of the first pixel point and the channel values of the second pixel points of corresponding colors.

The first pixel point is the pixel point, which corresponds to the first edge, in the source image, and the second pixel points are pixel points, which are adjacent to the first pixel point, in the source image.

For example, the first edge is a left or right edge of the first panel, which corresponds to at least one column of pixel points in the source image, that is, pixel points displayed on at least one column of pixels within the edge of the first panel. The pixel points in the at least one column of pixel points are the first pixel points, and the pixel points in a column adjacent to the at least one column of pixel points are the second pixel points. The adjacent column may be one or more columns. In the case that the weighted value is calculated, the first pixel points and the second pixel points in the same row may be subjected to weighted calculation, and a weighted value of a red channel, a weighted value of a green channel, and a weighted value of a blue channel are calculated, and the calculated weighted value of the three channels constitute pixel values of the third pixel points.

In the case that the first edge is an upper or lower edge of the first panel, the first edge corresponds to at least one row of pixel points in the source image, that is, pixel points displayed on at least one row of pixels within the edge of the first panel. The pixel points in a row adjacent to the at least one row of pixel points are the second pixel points. The first pixel points and the second pixel points in the same column may be subjected to weighted calculation to calculate the weighted values.

Illustratively, S202 may include:

determining a weight of the first pixel point and weights of the second pixel points based on a misalignment size of screen stacking, wherein the greater the misalignment size of screen stacking, the less the weight of the first pixel point, and the greater the weights of the second pixel points; the misalignment size of screen stacking indicates a number of arrays of the primary pixels whose orthographic projections are outside the display face of the second panel, and an arrangement direction of the arrays of the primary pixels is parallel to the first edge of the first panel; and calculating the weighted values of the channel values of the first pixel point and the channel values of the second pixel points of the corresponding colors based on the weight of the first pixel point and the weights of the second pixel points.

Optionally, a number of arrays of the second pixel point is equal to a number of arrays of the third pixel points.

The weights for calculating the pixel values of the third pixel points in different arrays are different in the case that the number of arrays of the third pixel points is greater than one. In this way, two to three rows or columns of pixel points adjacent to the first pixel point may be replaced with the weighted pixel values. In this case, different rows or columns can be subjected to weighted calculation with different weights, thereby avoiding the same screen of two rows or columns.

The number of arrays refers to a number of rows or a number of columns. The number of arrays refers to the number of rows in the case that the first edge corresponds to at least one row of pixels; and the number of arrays refers to the number of columns in the case that the first edge corresponds to at least one column of pixels.

In other embodiments, the number of arrays of the second pixel points and the number of arrays of the third pixel points may also be different. For example, the number of arrays of the second pixel points is greater than the number of arrays of the third pixel points. For example, in the case that the number of arrays of the second pixel points is greater than the number of arrays of the third pixel points, the second pixel points closest to the first edge are replaced with the third pixel points of all arrays. For another example, in the case that the number of arrays of the second pixel points is less than the number of arrays of the third pixel points, all second pixel points are replaced with the third pixel points of the same array number.

Illustratively, for an 8K4K-resolution stacking-screen, in the case that primary pixels and secondary pixels are misaligned by less than one primary pixel, less than one row/column of primary pixels at the edge may lack corresponding backlight. In this case, the color shift or darkening of the primary pixels in the one row/column may occur, that is, the aforementioned first pixel points cannot be displayed normally. In this case, the weighted values of the second pixel points and the first pixel points displayed in the primary pixels of the adjacent one row/column on the inner side may be calculated to acquire the pixel values of the third pixel points, and the third pixel points are then displayed in the primary pixels of the adjacent one row/column on the inner side. In the case that the primary pixels and the secondary pixels are misaligned by greater than or equal to one primary pixel, greater than or equal to one row/column of primary pixels at the edge may lack corresponding backlight. In this case, the primary pixels of one row/column at the most edge are completely blackened, and the primary pixels of one row/column of the second most edge are darkened or have a color shift, such that the aforementioned first pixel points cannot be displayed normally. In this case, the weighted values of the second pixel points and the first pixel points displayed in primary pixels of two rows/columns on the inner side adjacent to the two rows/columns may be calculated to acquire the pixel values of the third pixel points, and the third pixel points are then displayed in the primary pixels of the adjacent two rows/columns on the inner side.

The above-mentioned misalignment may be also present in a 4K4K-resolution stacking-screen, and may be processed by the same method as that of 8K4K.

A description is made by taking 8K4K stacking-screen as an example. For example, in the case that the first edge is an upper edge and the pixels of the first edge are in a first row, the first three rows of the source image are weighted based on Formula (1):

$$src1(1,:,1:3)=fr11*src(1,:,1:3)+fr12*src(2,:,1:3)+fr13*src(3,:,1:3);$$

$$src1(2,:,1:3)=fr21*src(1,:,1:3)+fr22*src(2,:,1:3)+fr23*src(3,:,1:3);$$

$$src1(3,:,1:3)=fr31*src(1,:,1:3)+fr32*src(2,:,1:3)+fr33*src(3,:,1:3), \qquad (1).$$

In src1(1,:,1:3), "src1" represents a channel value of a third pixel point; "1" represents the first row; and "1:3" represents that three channels of red, green, and blue are calculated based on the formula. src represents a channel value in the source image. fr represents first rows, which means the first few rows. fr11 represents a weight of the first row of pixel points in calculating a weighted value of the first row; fr12 represents a weight of the second row of pixel points in calculating the weighted value of the first row; and fr21 represents a weight of the first row of pixel points in calculating the weighted value of the second row, and the like.

fr11, fr12, fr13, fr21, fr22, fr23, fr31, fr32, and fr33 are all weights, and the default values are 1, 0, 0, 0, 1, 0, 0, 0, 1 in the case of no misalignment; and each weight is usually a decimal between 0 and 1 in the case of misalignment, and may be represented by a decimal of 8 bit. The first bit is an integer bit, and the subsequent seven bits are decimal bits.

It should be noted that, as the first row cannot be displayed, the weighted value of the first row may not be calculated, that is, src1(1,:,1:3) is not necessarily calculated; or after calculation, the pixel points in the source image are not replaced.

In the case that the first edge is a lower edge and the pixels of the first edge are in a $4320^{th}$ row, the last three rows of the source image are weighted based on Formula (2):

$$src1(4320,:,1:3)=lr11*src(4320,:,1:3)+lr12*src(4319,:,1:3)+lr13*src(4318,:,1:3);$$

$$src1(4319,:,1:3)=lr21*src(4320,:,1:3)+lr22*src(4319,:,1:3)+lr23*src(4318,:,1:3);$$

$$src1(4318,:,1:3)=lr31*src(4320,:,1:3)+lr32*src(4319,:,1:3)+lr33*src(4318,:,1:3), \qquad (2).$$

In src1(4320,:,1:3), "src1" represents a channel value of a third pixel point; "4320" represents the 4320 row; and "1:3" represents that three channels of red, green, and blue are calculated based on the formula. src represents a channel value in the source image. lr represents last rows, which mean the last few rows. lr11 represents a weight of the last row of pixel points in calculating a weighted value of the last row; lr12 represents a weight of the second last row of pixel points in calculating the weighted value of the last row; and lr21 represents a weight of the last row of pixel points in calculating the weighted value of the second last row, and the like.

In the case that the first edge is a left edge and the pixels of the first edge are in a first column, the first three columns of the source image are weighted based on Formula (3):

$$src1(:,1,1:3)=fc11*src(:,1,1:3)+fc12*src(:,2,1:3)+fc13*src(:,3,1:3);$$

$$src1(:,2,1:3)=fc21*src(:,1,1:3)+fc22*src(:,2,1:3)+fc23*src(:,3,1:3);$$

$$src1(:,3,1:3)=fc31*src(:,1,1:3)+fc32*src(:,2,1:3)+fc33*src(:,3,1:3), \qquad (3).$$

In src1(:,1,1:3), "src1" represents a channel value of a third pixel point; ",1" represents the first column; and "1:3" represents that three channels of red, green, and blue are calculated based on the formula. src represents a channel value in the source image. fc represents first columns, which means the first few columns. fc11 represents a weight of the first column of pixel points in calculating a weighted value of the first column; fc12 represents a weight of the second column of pixel points in calculating the weighted value of the first column; and fc21 represents a weight of the first column of pixel points in calculating the weighted value of the second column, and the like.

In the case that the first edge is a right edge and the pixels of the first edge are in a $7680^{th}$ column, the last three columns of the source image are weighted based on Formula (4):

$$src1(:,7680,1:3)=lc11*src(:,7680,1:3)+lc12*src(:,7679,1:3)+lc13*src(:,7678,1:3);$$

$$src1(:,7679,1:3)=lc21*src(:,7680,1:3)+lc22*src(:,7679,1:3)+lc23*src(:,7678,1:3);$$

$$src1(:,7678,1:3)=lc31*src(:,7680,1:3)+lc32*src(:,7679,1:3)+lc33*src(:,7678,1:3), \qquad (4).$$

In src1(:,7680,1:3), "src1" represents a channel value of a third pixel point; ",7680" represents the $7680^{th}$ column; and "1:3" represents that three channels of red, green, and blue are calculated based on the formula. src represents a channel value in the source image. lc represents last columns, which means the last few columns. lc11 represents a weight of the last column of pixel points in calculating a weighted value of the last column; lc12 represents a weight of the second last column of pixel points in calculating the weighted value of the last column; and lc21 represents a weight of the last column of pixel points in calculating the weighted value of the second last column, and the like.

The magnitudes of the weights may be determined based on a misalignment size of screen stacking. Illustratively, the weight values for different misalignment sizes may be saved first, and the corresponding weights are selected after the misalignment size of screen stacking is determined.

In the embodiments of the present disclosure, the misalignment size of screen stacking may be determined by designing a specific pattern, such that an alignment situation of the two panels is determined.

Optionally, the method may further include: displaying a first pattern at a first position on the first panel;
  displaying a second pattern at a second position on the second panel, wherein the first position is at least partially opposite to the second position in the case that the first panel and the second panel are not misaligned; and
  determining the misalignment size of screen stacking of the first panel and the second panel based on luminance of the first pattern.

The above pattern designs are illustrated for an 8K4K-resolution stacking-screen and a 4K4K-resolution stacking-screen.

An 8K4K alignment pattern design is adopted.

Figure 5:
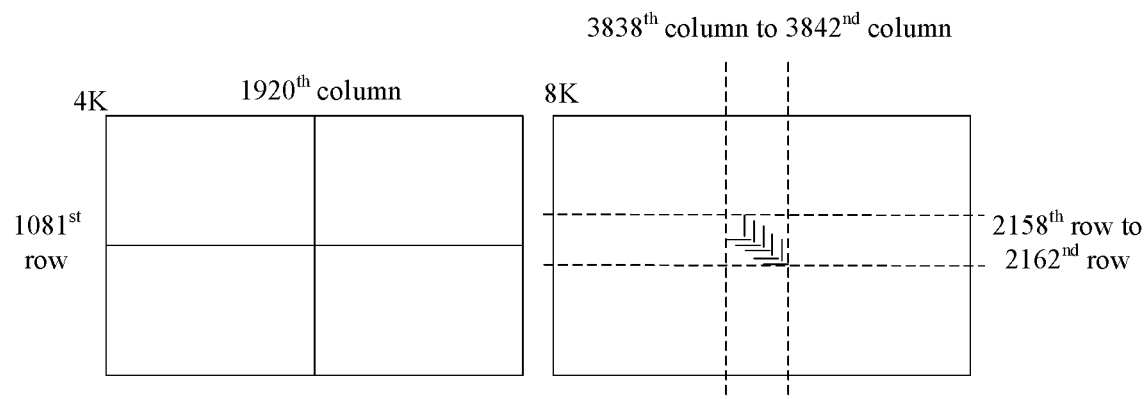
FIG. 5 and FIG. 6 are schematic diagrams of detection of misalignment in a stacking-screen according to an embodiment of the present disclosure.

An 8K4K alignment pattern is shown in FIG. 5: a display image of secondary pixels is a W (white) cross-line (first pattern). As shown on the left side of FIG. 5, a position (first position) of a bright line is: a $1080^{th}$ row and a $1920^{th}$ column. A display image of primary pixels is horizontal/vertical alignment short line segments (second pattern). As shown on the right side of FIG. 5, horizontal short lines are presented in $2158^{th}$ to $2162^{nd}$ rows, and vertical short lines are presented in $3838^{th}$ to $3842^{nd}$ columns (a second position). An alignment relationship is determined according to the luminance of the short lines displayed by the primary pixels. For example, in the case that the luminance is greater, the alignment is more accurate. The misalignment size of screen stacking may be acquired based on the luminance value.

A 4K4K alignment pattern design is adopted.

Figure 6:
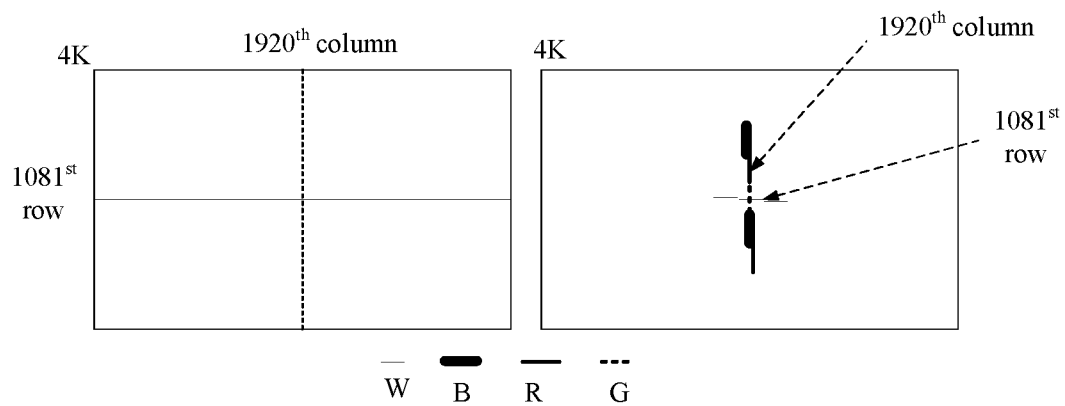

A 4K4K alignment pattern is shown in FIG. 6: a display image of secondary pixels is a bright cross-line (the first pattern). As shown on the left side of FIG. 6, a position (first position) of a bright line is: RGB in a $1080^{th}$ row are all bright (white), and G (green) in a $1920^{th}$ column is bright. The display image of primary pixels includes single-pixel white lines (the second pattern) along a horizontal direction in a position from a $1079^{th}$ row to a $1081^{st}$ row (the second position); and includes single-color lines (the second pattern) along a vertical direction, wherein the $1919^{th}$ column (the second position) is B, the $1920^{th}$ (the second position) column is R/G/B in sequence, and the $1921^{st}$ column (the second pattern) is R. An alignment relationship is determined according to the luminance of the short lines displayed by the primary pixels.

In S203, a first image is acquired by replacing the pixel values of the second pixel points in the source image with the pixel values of the third pixel points.

S202 and S203 may be referred to as frame processing. Through the frame processing, the pixel points corresponding to the first edge are compressed into adjacent rows of pixel points to display, thereby avoiding the problem of loss of the content of the pixel points corresponding to the first edge due to the misalignment of the stacking-screen.

In S204, first grayscale data of the second panel is acquired by extracting a maximum grayscale of three channels of the pixel points from the first image.

Illustratively, an input is src1, 10 bit; an output is sub1, 10 bit; and an extraction method is shown in Formula (5):

$$sub1=\max(src1(R,G,B)), \qquad (5).$$

sub1 represents the first grayscale data of the second panel; and max represents a maximum grayscale in the three RGB channels.

S204 may be referred to as luminance extraction. By extracting the maximum value in the three channels, it can be ensured that the backlight of the primary pixels is sufficient to support the display luminance of the primary pixels. The luminance of the pixels of the actual stacking-screen may be finely adjusted through the primary pixels.

In S205, second grayscale data of the second panel is acquired by shifting the first grayscale data based on a misalignment size of screen stacking.

In the shifting process, the greater the misalignment size of screen stacking, the more the shifting. The misalignment size of screen stacking refers to the number of arrays of the primary pixels whose orthographic projections are outside the display face of the second panel.

Illustratively, S205 may include:
  determining the first edge with the misalignment size of screen stacking greater than or equal to one array of primary pixels; and translating the first grayscale data along a direction toward the first edge, wherein the magnitude of the shifting is equal to an integer part of the misalignment size of screen stacking.

In the case that the first panel and the second panel are misaligned, the edge cannot be displayed normally, and the luminance may become stronger or weaker due to the misalignment and superposition of the primary pixels and the secondary pixels, thereby causing bright lines or dark lines. The bright lines may cause color shift, and the dark lines may cause low local contrast (especially in a scenario of the display of black words on white background of the 4K4K stacking-screen), the user experience may be affected. Therefore, it is necessary to shift the first grayscale data to reduce the misalignment, thereby reducing the problem of poor experience caused by the misalignment.

Figure 7:
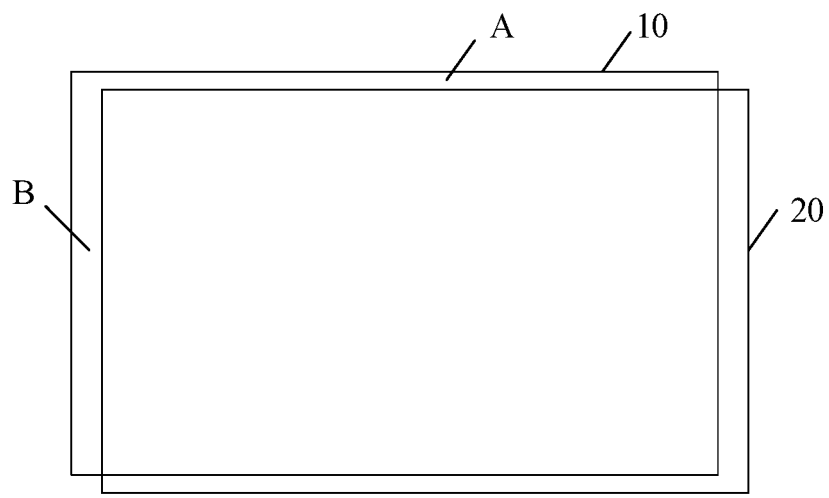
FIG. 7 is a schematic diagram of misalignment according to an embodiment of the present disclosure.

Illustratively, two registers, Flag_r and Flag_c, may be configured to record the misalignment of rows (that is, the misalignment along a column direction) and the misalignment of columns (that is, the misalignment along a row direction) in the first panel, respectively. FIG. 7 provides a schematic diagram of the misalignment. Referring to FIG. 7, the first panel 10 and the second panel 20 are misaligned along two directions. The misalignment along the column direction is presented in an area A in FIG. 7, and the misalignment along the row direction is presented in an area B in FIG. 7. According to the misalignment size, the values of the register may be organized into the following 3 cases, which may combine nine value-taking modes.

TABLE 2

| Flag_r | Misalignment size along the column direction |
| --- | --- |
| 0 | Misalignment size < one primary pixel |
| 1 | Upward misalignment ≥ one primary pixel |
| 2 | Downward misalignment ≥ one primary pixel |

| Flag_c | Misalignment size along the raw direction |
| --- | --- |
| 0 | Misalignment size < one primary pixel |
| 1 | Upward misalignment ≥ one primary pixel |
| 2 | Downward misalignment ≥ one primary pixel |

In the case that flag_r is equal to 0: no shift processing is required along the column direction;
  in the case that flag_c is equal to 0: no shift processing is required along the row direction;
  in the case that flag_r is equal to 1 or 2: shift processing is required along the column direction; and
  in the case that flag_c is equal to 1 or 2: shift processing is required along the row direction.

In the case that flag_r is equal to 1, the grayscale data of the second panel is shifted forward (upward) along the column direction; in the case that flag_r is equal to 2, the grayscale data of the second panel is shifted rearward (downward) along the column direction; in the case that flag_c is equal to 1, the grayscale data of the second panel is shifted forward (leftward) along the row direction; and in the case that flag_c is equal to 2, the grayscale data of the second panel is shifted rearward (rightward) along the row direction.

Illustratively, translating the first grayscale data along the direction toward the first edge includes:
  adding at least one array of data bits ahead the first array of the first grayscale data;
  translating the first grayscale data along the direction toward the first edge, such that the at least one array of data bits is filled, and at least one array of data bits is vacated at the end of the first grayscale data; and
  filling the at least one array of data bits vacated at the end of the first grayscale data with at least one array of data at the end of the first grayscale data.

The shifting process is described hereinafter by taking Flag_r being equal to 1 as an example. In the case that Flag_r is equal to 1, the first panel is misaligned upward by greater than or equal to one primary pixel. In this case, taking the shifting of 1 bit as an example, the grayscale data of the second panel needs to be shifted forward along the column direction.

One position (vacancy) is added ahead first data of each column of first grayscale data sub1 of the second panel, and the data of each column is shifted forward by one position. The last vacated position is filled with the last data of each column. Therefore, the misalignment of the stacking-screen between the two panels is reduced, and even eliminated.

Optionally, a position (vacancy) is added to the end of the last data of each column, and filled with the last data of each column. In this way, the number of data in each column is an even number, which is more in line with the grayscale data design of the panels.

The above embodiments are described by taking the shifting of one bit as an example. In other embodiments, the number of shifted bits may be an integer greater than 1.

In S206, third grayscale data of the second panel is acquired by calculating a weighted value of the grayscale values of each of the secondary pixels and its surrounding secondary pixels based on the second grayscale data.

In the embodiments of the present disclosure, as the resolutions of the stacking-screen display devices are different, the number of pixels corresponding to the first panel and the number of pixels corresponding to the second panel are different. It is assumed that a ratio of the primary pixels in the first panel to the secondary pixels in the second panel is D, and D is a positive number.

In the case that the resolutions of the first panel and the second panel are equal, each primary pixel corresponds to one sub-pixel, that is, D is equal to 1. For example, in the 4K4K stacking-screen display device, D is equal to 1.

In the case that the resolutions of the first panel and the second panel are different, the number of primary pixels is generally greater than the number of secondary pixels, and each primary pixel corresponds to more than one sub-pixel, that is, D is greater than 1. For example, in the 8K4K stacking-screen display device, D is equal to 4.

In an implementation of the embodiments of the present disclosure, the resolutions of the first panel and the second panel are equal. In this case, S206 may include the following steps.

In S2061A, the second grayscale data is taken as grayscale data to be calculated.

That is, in the case that D is equal to 1, the grayscale data sub20 to be calculated is equal to sub1, and the sub1 is the shifted data. S2061A is an optional step.

In S2062A, the third grayscale data is acquired by calculating a weighted value of a grayscale mean value corresponding to the secondary pixels and a maximum grayscale value corresponding to the secondary pixels in the grayscale data to be calculated are calculated, wherein the grayscale mean value corresponding to the secondary pixels indicates a grayscale mean value of a plurality of first secondary pixels within a first range of the secondary pixels, and the maximum grayscale value corresponding to the secondary pixels indicates a maximum grayscale value of a plurality of second secondary pixels within a second range of the secondary pixels; wherein the first range and the second range are same or different; and at least one of the first secondary pixels is overlapped with the second secondary pixels, or none of the first secondary pixels is overlapped with the second secondary pixels.

The range may be a range of 3*3 secondary pixels centered on the secondary pixel. In the case that the secondary pixels are at the edge of the second panel, the 3*3 range of the secondary pixel lacks a secondary pixel. In this case, a grayscale value may be compensated to a position where the secondary pixel is missing within the 3*3 range of the secondary pixel. For example, the grayscale value of the secondary pixel in the center of 3*3 range is compensated to the position where the secondary pixel is missing, or 0 is compensated to the position where the secondary pixel is missing; and a calculation is then performed by taking this secondary pixel as the center.

After the shifting processing in S205, most of the misalignments have been solved. Taking a misalignment of 2.5 primary pixels as an example, two rows are shifted by S205, which means that the actual misalignment only remains 0.5 primary pixel. The misalignment of 0.5 primary pixel cannot be solved by shifting. In this case, the backlight provided by the secondary pixels corresponding to the primary pixels may be weighted by the luminance of the plurality of secondary pixels. Therefore, the calculation may be performed by S2062A.

Illustratively, the step may be implemented by a filter. For example, the secondary pixels within the first range of the secondary pixels is filtered by a first filter, and the grayscale mean value of the plurality of first secondary pixels is selected and calculated; the secondary pixels within a second range of the secondary pixels is filtered by a second filter, and a maximum grayscale value of the plurality of second secondary pixels is selected and determined; and the weighted value of the grayscale mean value of the plurality of first secondary pixels and the maximum grayscale value of the plurality of second secondary pixels is calculated.

Optionally, the first filter and the second filter have a size of 3*3.

Taking both the first range and the second range being 3*3 and the first filter and the second filter being 3*3 filters as examples, referring to Formula (6):

$$sub2(i,j)=k_f*\Sigma\Sigma(sub20(i-1: i+1,j-1,j+1)*\text{filter\_w})+$$
$$k_m*\max(\text{filter\_ww}*sub20(i-1:i+1,j-1:j+1)), \quad (6).$$

sub2(i,j) represents a grayscale of a secondary pixel in an $i^{th}$ row and a $j^{th}$ column in the third grayscale data; $k_f$ and $k_m$ are weights; a bit width is 8 bit (a first bit is an integer bit, the remaining seven bits are decimal bits); $k_f+k_m=1$, $k_f$ and $k_m$ are 0.5 and 0.5 by default, which may be set as required; and sub20(i−1:i+1,j−1 j+1) represents nine secondary pixels centered on (i,j) in the grayscale data to be calculated.

filter_w is a 3*3 filter template including 9 configurable parameters (a11, a12, a13; a21, a22, a23; a31, a32, a33), and a bit width of each configurable parameter is 8 bit (a first bit is an integer bit and the remaining seven bits are decimal bits).

In case of no misalignment, a22 is 1 by default, other values are 0. That is:

$$\text{filter\_w} = \begin{bmatrix} 0 & 0 & 0 \\ 0 & 1 & 0 \\ 0 & 0 & 0 \end{bmatrix}.$$

In the case of misalignment, there is only a misalignment of less than one pixel due to the shifting by S205, and each configurable parameter in filter_w may be set accordingly based on the misalignment.

For example, a misalignment only occurs along the row direction. In this case, $$\text{filter\_w} = \begin{bmatrix} 0 & 0 & 0 \\ x & 1-x & 0 \\ 0 & 0 & 0 \end{bmatrix}, \text{ or}$$

$$\text{filter\_w} = \begin{bmatrix} 0 & 0 & 0 \\ 0 & 1-x & x \\ 0 & 0 & 0 \end{bmatrix}.$$

In the above formulas, a value range of x is from 0 to 1, and the value of x is related to the misalignment size along the corresponding direction.

filter_ww is a 3*3 filter template including 9 configurable parameters (w11, w12, w13; w21, w22, w23; w31, w32, w33), and a bit width of each configurable parameter is 1bit.

In case of no misalignment, w22 is 1 by default, and other values are 0 respectively. That is:

$$\text{filter\_ww} = \begin{bmatrix} 0 & 0 & 0 \\ 0 & 1 & 0 \\ 0 & 0 & 0 \end{bmatrix}.$$

In the case of misalignment, there is only a misalignment of less than one pixel due to the shifting by S205, and each configurable parameter in filter_ww may be set accordingly based on the misalignment.

For example, a misalignment only occurs along the row direction. In this case, $$\text{filter\_ww} = \begin{bmatrix} 0 & 0 & 0 \\ 1 & 1 & 0 \\ 0 & 0 & 0 \end{bmatrix}, \text{ or}$$

$$\text{filter\_ww} = \begin{bmatrix} 0 & 0 & 0 \\ 0 & 1 & 1 \\ 0 & 0 & 0 \end{bmatrix}.$$

As a maximum value, but a mean value, is calculated for the secondary pixels selected by filter_ww, the configurable parameter corresponding to a secondary pixel to be selected is set as 1.

In the filtering process of sub20(i−1:i+1,j−1:j+1), a secondary pixel corresponding to a position where the configurable parameter in the filter template is 0 do not actually participate in the calculation of the mean value or the maximum value. The values of the two filter templates may be different, and the secondary pixels that work actually may also be different when the mean value and the maximum value are calculated.

In the above example, the first range and the second range are same, and the first secondary pixels and the second secondary pixels are overlapped with each other completely.

In an implementation of the embodiments of the present disclosure, the resolutions of the first panel and the second panel are different. In this case, S206 may include the following steps.

In S2061B, grayscale data to be calculated is acquired by calculating a weighted value of a grayscale mean value and a maximum value of the plurality of the primary pixels affected by the secondary pixels.

Illustratively, in the case of D is greater than 1, the method for calculating the grayscale data sub20 to be calculated is shown in Formula (7):

$$sub20(i,j)=K_{L1}*\text{floor}(\max(\text{block}))+(1-K_{L1})*\text{floor}(\text{mean}(\text{block})), \quad (7)$$

sub20(i,j) represents a grayscale of a secondary pixel in an $i^{th}$ row and a $j^{th}$ column in the grayscale data to be calculated; $K_{L1}$ represents a weight, which may be set as required; floor represents a round-down function; max (block) represents a maximum grayscale value in a plurality of primary pixels corresponding to the secondary pixel in the $i^{th}$ row and the $j^{th}$ column, and block represents a plurality of primary pixels corresponding to the secondary pixel; and mean (block) represents a grayscale mean value of the plurality of primary pixels corresponding to the secondary pixel in the $i^{th}$ row and the $j^{th}$ column. The grayscales of the primary pixels may be determined based on the source image according to a conventional grayscale distribution ratio of the stacking-screen display device.

In the case of D is equal to 2, the aforementioned block includes 4 primary pixels.

In S2062B, the third grayscale data is acquired by calculating a weighted value of a grayscale mean value corresponding to the secondary pixels and a maximum grayscale value corresponding to the secondary pixels in the grayscale data to be calculated, wherein the grayscale mean value corresponding to the secondary pixels indicates a grayscale mean value of a plurality of first secondary pixels within the first range of the secondary pixels, and the maximum grayscale value corresponding to the secondary pixels indicates a maximum grayscale value of a plurality of second secondary pixels within the second range of the secondary pixels; wherein the first range and the second range are same or different; and at least one of the first secondary pixels is overlapped with the second secondary pixels, or none of the first secondary pixels is overlapped with the second secondary pixels.

The method for calculating S2062B is the same as S2062A, except that the input grayscale data to be calculated is different, which is not repeated herein.

S205 and S206 may be referred to as pre-processing. Due to the misalignment of the stacking-screen, the first panel and the second panel are not accurately aligned. The shifting by S205 can reduce the misalignment, solve an integer part in the case that the misalignment is greater than 1, and reduce the misalignment to less than one primary pixel. As the misalignment is usually not an integer, the misalignment problem cannot be completely solved by the shifting. In this case, by the weighted calculation, the remaining part of the misalignment less than one primary pixel after S205 can be solved by S206, such that a grayscale of the second panel corresponding to one primary pixel of the first panel is a weighted value of the grayscales of a plurality of secondary pixels acting on the primary pixel. Therefore, the luminance of the backlight acquired by the primary pixel from the corresponding plurality of secondary pixels is basically unchanged compared to the case of no misalignment, thereby avoiding the problems such as color shift caused by the misalignment.

In S207, a grayscale mapping table is acquired.

The grayscale mapping table includes a mapping relationship of the third grayscale data and the fourth grayscale data. The grayscale mapping table may include mapping relationships of various resolutions. Therefore, the method is compatible with stacking-screen display devices with different resolutions, such as 8K4K and 4K4K. The grayscale mapping table may only include a mapping relationship of resolutions corresponding to the current stacking screen.

In the grayscale mapping table, grayscale values in the fourth grayscale data are not less than corresponding grayscale values in the third grayscale data in the case that the resolutions of the first panel and the second panel are equal (referring to values in a sub column and Sub3 (D=1) column in Table 3); and the grayscale values in the fourth grayscale data are not less than the corresponding grayscale values in the third grayscale data in the case that the resolutions of the first panel and the second panel are different, and the grayscale values are greater than a threshold (referring to values in a sub column and Sub3 (D=4) column in Table 3, wherein the threshold may be 192).

The mapping relationship of the fourth grayscale data sub3 and the third grayscale data sub2 is as follows: sub3=$f_1$ (sub2).

The mapping relationship is converted into a form of a mapping relationship table, that is, the corresponding relationship of some points is determined. As shown in Table 3, Table 3 is an example of the mapping relationship table.

TABLE 3

| Serial number | Sub2 | Sub 3 (D = 1) | Sub3 (D = 4) | Distance |
|---|---|---|---|---|
| 1 | 0 | 0 | 0 | \ |
| 2 | 128 | 350 | 92 | $2^7$ |
| 3 | 256 | 597 | 380 | $2^7$ |
| 4 | 384 | 750 | 796 | $2^7$ |
| 5 | 512 | 880 | 980 | $2^7$ |
| 6 | 640 | 932 | 1023 | $2^7$ |
| 7 | 768 | 980 | 1023 | $2^7$ |
| 8 | 896 | 999 | 1023 | $2^7$ |
| 9 | 1023 | 1023 | 1023 | $2^7$ |

In Table 3, the distance refers to a distance between endpoints of two adjacent sub2. The distance is generated in dividing a grayscale value range of the third grayscale data when establishing the grayscale mapping table. In other embodiments, the grayscale mapping table may not include the parameters of the column. The above table is merely exemplary, and other points may also be taken as the endpoints in the above table.

In S208, the third grayscale data is mapped into the fourth grayscale data by the grayscale mapping table.

In the grayscale mapping table, the grayscale values in the third grayscale data are organized into a plurality of consecutive first ranges, and the grayscale values in the fourth grayscale data are organized into a plurality of consecutive second ranges that are in one-to-one correspondence with the plurality of first ranges.

S208 may include: determining the grayscale mapping table based on the resolutions of the first panel and the second panel; determining the first ranges of the grayscale values in the third grayscale data in the first ranges in the grayscale mapping table; determining the second ranges corresponding to the first ranges in the grayscale mapping table; and determining the grayscale values in the fourth grayscale data corresponding to the grayscale values in the third grayscale data by performing linear interpolation based on endpoints of the determined second ranges.

Illustratively, the resolution of the first panel is 4K or 8K, and the resolution of the second panel is 4K. The corresponding grayscale mapping tables are different in the case that the resolutions of the first panel are different. That is, the grayscale mapping table corresponding to the first panel of 4K is different from the grayscale mapping table corresponding to the first panel of 8K. For example, the two cases correspond to a part of Table 3.

Illustratively, according to the grayscale mapping table, endpoints of a range where sub2 is may be determined based on the value of sub2; then, endpoints of sub3 are determined based on the table and the resolution of the stacking-screen display panel (corresponding to the value of D); and the fourth grayscale data is then determined by performing linear interpolation on the determined endpoints of sub3.

Illustratively, the input third grayscale data x is equal to 220, and the method for solving the fourth grayscale data y is as follows:

x, equal to 220, is within an interval of [192,256], that is, x ∈ [sub2(4),sub2(5)]. Therefore, y needs to be linearly interpolated within an interval of [sub3(4), sub3(5)]. A calculation formula of y is shown in Formula (8):

$$y = \frac{sub3(5) - sub3(4)}{sub2(5) - sub2(4)} * (x - sub2(4)) + sub3(4), \quad (8).$$

Values of sub2(4), sub3(5), and other values within brackets are the serial numbers in the above table.

S207 and S208 may be referred to as curve mapping, which enhances the grayscales of the secondary pixels, weakens the grayscales of the primary pixels, and avoids the problems such as ghosting and halo caused by greater transmittance of the primary pixels. The mapping fashion may increase the grayscale of the second panel and decrease the grayscales of the secondary pixels in the first panel. Therefore, ghosting and halos caused by greater grayscales of the primary pixels in the first panel are avoided. Meanwhile, by increasing the grayscale of the second panel, the luminance changes greatly in the case of a less grayscale, and the contrast ratio can also be increased. In addition, the overall luminance of the stacking-screen may not change.

In S209, whether the second panel includes an abnormal secondary pixel is detected based on the fourth grayscale data, wherein the abnormal secondary pixel is displayed as a bright line or a dark line.

Illustratively, S209 may include:
determining, based on grayscale values of a secondary pixel to be detected and its adjacent secondary pixels, whether the secondary pixel to be detected is displayed as a single-pixel bright line, a double-pixel bright line, or a tri-pixel bright line; and
determining, based on the grayscale values of the secondary pixel to be detected and its adjacent secondary pixels, whether the secondary pixel to be detected is displayed as a single-pixel dark line, a double-pixel dark line, or a tri-pixel dark line.

As the bright line and dark line are detected based on the grayscale values of the secondary pixel to be detected and its adjacent secondary pixels, at least two columns of 0 may be compensated to the left and right of the fourth grayscale data, and at least one row of 0 may be compensated to the top and bottom of the fourth grayscale data, such that the secondary pixel to be detected on the edge can be detected normally.

A method for detecting single-pixel bright line is as follows: the secondary pixel to be detected includes the single-pixel bright line in the case that any set of the following conditions is satisfied.

In a First Set of Conditions:
in the case that a secondary pixel to be detected and its two adjacent secondary pixels on the same side along a row direction of the secondary pixel to be detected are taken as a whole and detected by a bright line gradient detection template, acquired gradient value (vector_peak.*g_peak) is greater than a threshold T1*g_m, and a grayscale difference between the secondary pixel to be detected and each of the adjacent secondary pixels is smaller than a threshold T2, the secondary pixels adjacent to the secondary pixel to be detected are considered to be bright spots, that is, the secondary pixel to be detected includes a single-pixel bright line. vector_peak represents grayscale values of the aforementioned three secondary pixels, and g_peak represents the aforementioned bright line gradient detection template, that is, a 3*1 filter, g_peak=[−1,2,−1].

In a second set of conditions: in the case that its three adjacent secondary pixels on the same side along a row direction of the secondary pixel to be detected are taken as a whole and detected by a bright line gradient detection template, acquired gradient value (vector_peak.*g_peak) is greater than a threshold T1*g_m, and a grayscale difference between two spaced secondary pixels among the three secondary pixels is less than the threshold T2. In the case that the secondary pixel to be detected and its two adjacent secondary pixels on the same side of the secondary pixel to be detected are taken as a whole and detected by an edge gradient detection template, and acquired gradient value (vector_edge.*g_edge) is greater than the threshold T1*g_m, the second secondary pixel adjacent to the secondary pixel to be detected is considered to be a bright spot, that is, the secondary pixel to be detected includes a single-pixel bright line. vector_edge represents grayscale values of the secondary pixel to be detected and two secondary pixels on the same side of the secondary pixel to be detected, and g_edge represents the aforementioned edge gradient detection template, that is, a 3*1 filter, g_edge=[−1,2,−1].

In a third set of conditions: in the case that three secondary pixels on the same side along a row direction of the secondary pixel to be detected are taken as a whole spaced from the secondary pixel to be detected by one secondary pixel, and detected by a bright line gradient detection template, acquired gradient value (vector_peak.*g_peak) is greater than the threshold T1*g_m, and a grayscale difference between the two spaced secondary pixels among the three secondary pixels is less than the threshold T2. In the case that three adjacent secondary pixels on the same side of the secondary pixel to be detected are taken as a whole, and detected by an edge gradient detection template, acquired gradient value (vector_edge.*g_edge) is greater than the threshold T1*g_m. In the case that the secondary pixel to be detected and two adjacent secondary pixels on the same side of the secondary pixel to be detected are taken as a whole, and detected by a flat gradient detection template, and acquired gradient value (vector_plane.*g_plane) is greater than the threshold T1*g_m, the third secondary pixel adjacent to the secondary pixel to be detected is considered to be a bright spot, that is, the secondary pixel to be detected includes a single-pixel bright line. vector_plane represents grayscale values of the secondary pixel to be detected and two adjacent secondary pixels on the same side of the secondary pixel to be detected, and g_plane represents the aforementioned edge gradient detection template, that is, a 3*1 filter, g_edge=[−1,2,−1].

Figure 8:
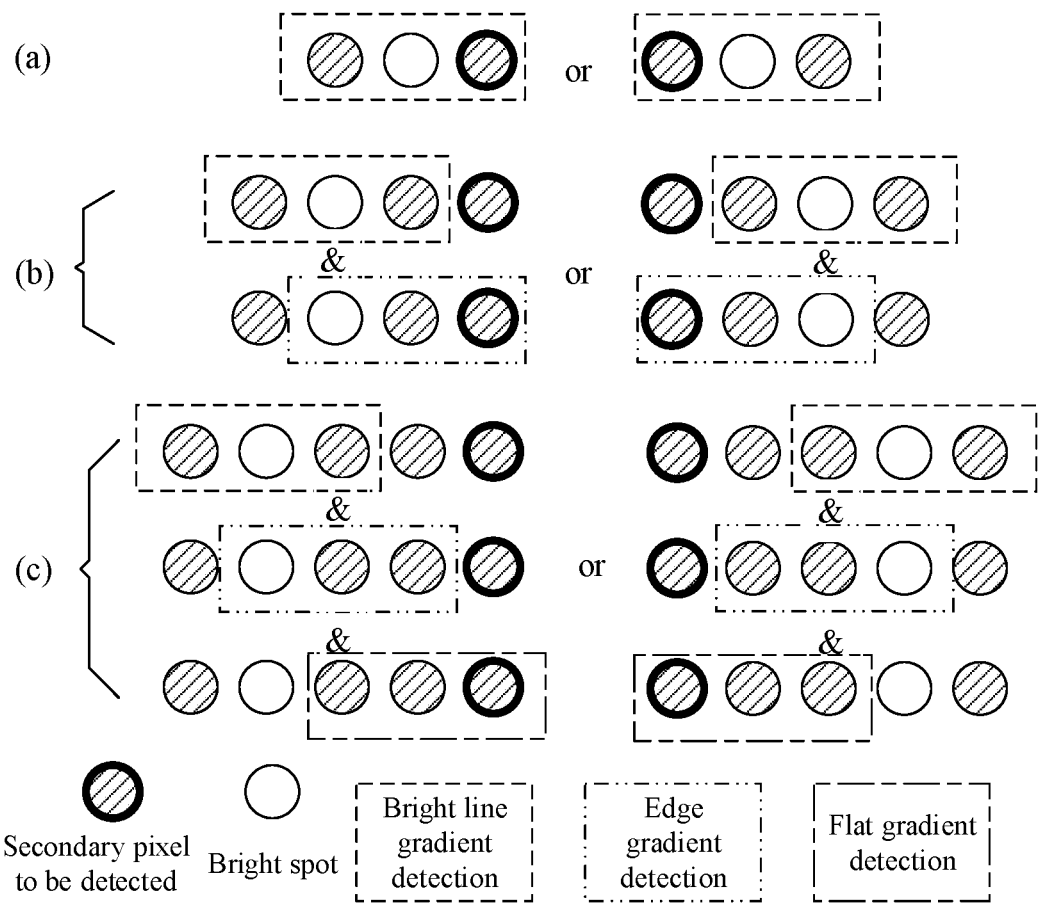

The detection of the above three cases is shown in FIG. 8. Different boxes represent detection with different templates. The details are shown in FIG. 8. The aforementioned three sets of conditions correspond to cases (a), (b), and (c) in FIG. 8.

A method for detecting double-pixel bright line is as follows: the secondary pixel to be detected includes a double-pixel bright line in the case that any set of the following conditions is satisfied.

Figure 9:
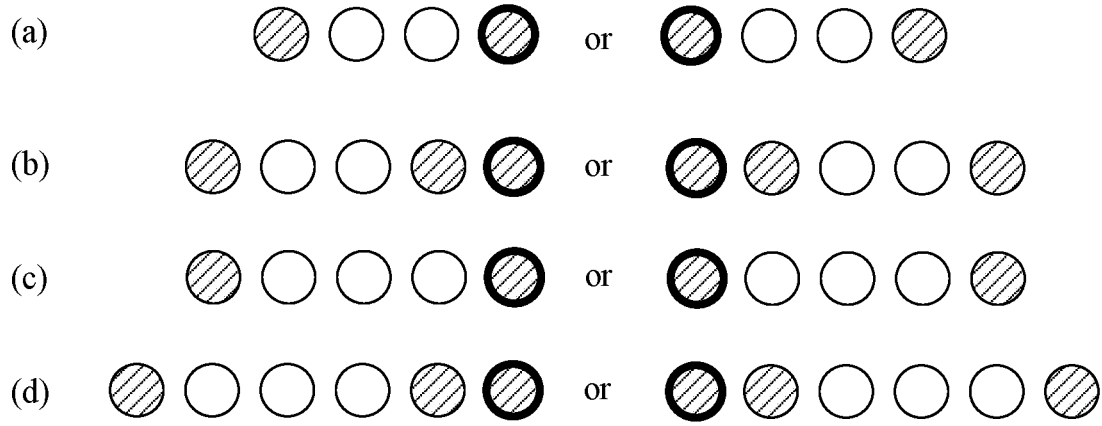

In a first set of conditions: in the case that a grayscale value of the secondary pixel to be detected center is less than Th1; and both grayscale values of first and second secondary pixels left adjacent to the secondary pixel to be detected are greater than Th2, and a grayscale value of the third secondary pixel left adjacent to the secondary pixel to be detected is less than Th1; or, both grayscale values of the first and second secondary pixels right adjacent to the secondary pixel to be detected are greater than Th2, and a grayscale value of the third secondary pixel right adjacent to the secondary pixel to be detected is less than Th1 (the first secondary pixel left adjacent to the secondary pixel to be detected is a first secondary pixel adjacent to the left side of the secondary pixel to be detected, the second secondary pixel left adjacent to the secondary pixel to be detected is a second secondary pixel adjacent to the left side of the secondary pixel to be detected, the first secondary pixel right adjacent to the secondary pixel to be detected is a first secondary pixel adjacent to the right side of the secondary pixel to be detected, and so on), the adjacent two secondary pixels of the secondary pixel to be detected are bright spots, and form a double-pixel bright line, as shown in (a) in FIG. 9.

In a second set of conditions: in the case that a grayscale value of the secondary pixel to be detected center is less than Th1; and both grayscale values of first and fourth secondary pixels left adjacent to the secondary pixel to be detected are less than Th1, and both grayscale values of second and third secondary pixels left adjacent to the secondary pixel to be detected are greater than Th2; or, both grayscale values of the first and fourth secondary pixels right adjacent to the secondary pixel to be detected are less than Th1, and both grayscale values of the second and third secondary pixel right adjacent to the secondary pixel to be detected are greater than Th2, the adjacent two secondary pixels spaced from the secondary pixel to be detected by one secondary pixel are bright spots, and form a double-pixel bright line, as shown in (b) in FIG. 9.

A method for detecting tri-pixel bright line is as follows: the secondary pixel to be detected includes a tri-pixel bright line in the case that any set of the following conditions is satisfied.

In a first set of conditions: in the case that a grayscale value of the secondary pixel to be detected center is less than Th1; and both grayscale values of first, second, and third secondary pixels left adjacent to the secondary pixel to be detected are greater than Th2, and a grayscale value of the fourth secondary pixel left adjacent to the secondary pixel to be detected is less than Th1; or, both grayscale values of first, second, and third secondary pixels right adjacent to the secondary pixel to be detected are greater than Th2, and a grayscale value of the fourth secondary pixel right adjacent to the secondary pixel to be detected is less than Th1, the adjacent three secondary pixels of the secondary pixel to be detected are bright spots, and form a tri-pixel bright line, as shown in (c) in FIG. 9.

In a second set of conditions: in the case that a grayscale value of the secondary pixel to be detected center is less than Th1; and both grayscale values of first and fifth secondary pixels left adjacent to the secondary pixel to be detected are less than Th1, and both grayscale values of second, third, and fourth secondary pixels left adjacent to the secondary pixel to be detected are greater than Th2; or, both grayscale value of first and fifth secondary pixels right adjacent to the secondary pixel to be detected are less than Th1, and both grayscale values of e second, third and fourth secondary pixels right adjacent to the secondary pixel to be detected are greater than Th2, the adjacent three secondary pixels spaced from the secondary pixel to be detected by one secondary pixel are bright spots, and form a tri-pixel bright line, as shown in (d) in FIG. 9.

A method for detecting single-pixel dark line is as follows.

In vertical single-pixel dark line detection: in the case that a grayscale value of the secondary pixel to be detected center is less than Th1; and both grayscale values of the first secondary pixel left adjacent to the secondary pixel to be detected and the first secondary pixel right adjacent to the secondary pixel to be detected are greater than Th2, the secondary pixel to be detected is a dark spot, and forms a single-pixel dark line, as shown in (a) in FIG. 10.

In transverse single-pixel dark line detection: in the case that a grayscale value of the secondary pixel to be detected center is less than Th1; and both grayscale values of the first secondary pixel top adjacent to the secondary pixel to be detected and the first secondary pixel bottom adjacent to the secondary pixel to be detected are greater than Th2, the secondary pixel to be detected is a dark spot, and forms a transverse single-pixel dark line, as shown in (b) in FIG. 10.

A method for detecting double-pixel dark line is as follows.

In the case that a grayscale value of the secondary pixel to be detected center is less than Th1; and a grayscale value of the first secondary pixel right adjacent to the secondary pixel to be detected is less than Th1, and both grayscale values of the first secondary pixel left adjacent to the secondary pixel to be detected and the second secondary pixel right adjacent to the secondary pixel to be detected are greater than Th2; or, a grayscale value of the first secondary pixel left adjacent to the secondary pixel to be detected is less than Th1, and both grayscale values of the second secondary pixel left adjacent to the secondary pixel to be detected and the first secondary pixel right adjacent to the secondary pixel to be detected are greater than Th2, the secondary pixel to be detected and one secondary pixel adjacent thereto are dark spots, and form a double-pixel dark line, as shown in (c) in FIG. 10.

A method for detecting tri-pixel dark line is as follows:
in the case that a grayscale value of the secondary pixel to be detected center is less than Th1; and
both grayscale values of the first secondary pixel left adjacent to the secondary pixel to be detected and the third secondary pixel right adjacent to the secondary pixel to be detected are greater than Th2, and both grayscale values of the first secondary pixel right adjacent to the secondary pixel to be detected and the second secondary pixel right adjacent to the secondary pixel to be detected are less than Th1; or, both grayscale values of the first secondary pixel left adjacent to the secondary pixel to be detected and the first secondary pixel right adjacent to the secondary pixel to be detected are less than Th1, and both grayscale values of the second secondary pixel left adjacent to the secondary pixel to be detected and the second secondary pixel right adjacent to the secondary pixel to be detected are greater than Th2; or, both grayscale values of the first secondary pixel and the second secondary pixel left adjacent to the secondary pixel to be detected are less than Th1, and both grayscale values of the third secondary pixel left adjacent to the secondary pixel to be detected and the first secondary pixel right adjacent to the secondary pixel to be detected are greater than Th2, the secondary pixel to be detected and two secondary pixels adjacent thereto are dark spots, and form a tri-pixel dark line, as shown in (d) in FIG. 10.

It should be noted that the aforementioned thresholds T1*g_m, T2, Th1, Th2, and the like may all be set as required. For example, T1 represents a fixed multiple, a value of T1 may be 1.2 or 1.5; g_m represents the grayscale value of the secondary pixel to be detected; a value of T2 is small, for example, less than or equal to 20; a value of Th1 may be greater than or equal to 200; and a value of Th2 may be less than or equal to 50.

In addition, the bright line detection is required for both 4K4K and 8K4K, and the dark line detection is required for 4K4K and not required for 8K4K.

In the above detection process, the bright line may be detected first, and the dark line may be then detected in the case that no bright line is detected. The dark line is not required to be detected in the case that the bright line is detected.

In S210, compensated fourth grayscale data is acquired by compensating the fourth grayscale data based on the grayscale values of secondary pixels on both sides of the abnormal secondary pixel in the case that the second panel includes the abnormal secondary pixel, such that the grayscale data of the second panel is acquired.

The 0-compensated fourth grayscale data is filtered. A module of 3*5 is taken each time and recorded as Tmp, a center value of Tmp is recorded as center, and a maximum value in Tmp is recorded as Max. Taking the center as the center, a module of 1*11 is taken and recorded as Tmp1, and a maximum value in Tmp1 is recorded as Max1. FIG. 11 is a schematic diagram of filtering of the fourth grayscale data. As shown in FIG. 11, S24 is a center, Tmp represents a part in a box covering S12 to S36, and Tmp1 represents a part in a box covering 0 to S29.

In the case that the single-pixel bright line is detected, it can be processed according to the following formula.

In the case that the first set of conditions is satisfied, the processing method is shown in Formula (9):

$$y_{sub32}=\text{floor}(k_{1\text{-}1pixel}*((\text{left}\|\text{right}-\text{center})*(2^{10}-\text{center})+2^{10}*\text{center})/2^{10});$$

$$y_{sub31}=\Sigma\Sigma Tmp*\text{filter1}, \quad (9)$$

$k_{1\text{-}1pixel}$ represents a dimming coefficient, which may be set as required; and left∥right represents that a bright spot is on the left or right of a center point, which is determined based on the actual situation. filter1 is a 3*5 filter.

In the case that the second set of conditions is satisfied, the processing method is shown in Formula (10):

$$y_{sub32}=\text{floor}(k_{1\text{-}2pixel}*((\text{left2}\|\text{right2}-\text{center})*(2^{10}-\text{center})+2^{10}*\text{center})/2^{10});$$

$$y_{sub31}=\Sigma\Sigma Tmp*\text{filter1}, \quad (10).$$

$k_{1\text{-}2pixel}$ represents a dimming coefficient, which may be set as required; and left2∥right2 represents that a bright spot is the second to the left or the second to the right of the center point, which is determined based on the actual situation.

In the case that the third set of conditions is satisfied, the processing method is shown in Formula (11):

$$y_{sub32}=\text{floor}(k_{1\text{-}3pixel}*((\text{left3}\|\text{right3}-\text{center})*(2^{10}-\text{center})+2^{10}*\text{center})/2^{10});$$

$$y_{sub31}=\Sigma\Sigma Tmp*\text{filter1}, \quad (11)$$

$k_{1\text{-}3pixel}$ represents a dimming coefficient, which may be set as required; and left3∥right3 represents that a bright spot is the third to the left or the third to the right of the center point, which is determined based on the actual situation.

Then, the compensated fourth grayscale data sub4 is acquired based on sub4=max (ysub31,ysub32).

In the case that the double-pixel bright line is detected, it can be processed according to the following formula.

In the case that the first set of conditions is satisfied, the processing method is shown in Formula (12):

$$y_{sub32}=\text{floor}(k_{2\text{-}1pixel}*((\text{Max1}-\text{center})*(2^{10}-\text{center})+2^{10}*\text{center})/2^{10});$$

$$y_{sub31}=\Sigma\Sigma Tmp*\text{filter1}, \quad (12)$$

$k_{2\text{-}1pixel}$ represents a dimming coefficient, which may be set as required.

In the case that the second set of conditions is satisfied, the processing method is shown in Formula (13):

$$y_{sub32}=\text{floor}(k_{2\text{-}2pixel}*((\text{Max1}-\text{center})*(2^{10}-\text{center})+2^{10}*\text{center})/2^{10});$$

$$y_{sub31}=\Sigma\Sigma Tmp*\text{filter1}, \quad (13)$$

$k_{2\text{-}2pixel}$ represents a dimming coefficient, which may be set as required.

Then, the compensated fourth grayscale data sub4 is acquired based on sub4=max (ysub31,ysub32).

In the case that the tri-pixel bright line is detected, it can be processed according to the following formula.

In the case that the first set of conditions is satisfied, the processing method is shown in Formula (14):

$$y_{sub32}=\text{floor}(k_{3\text{-}1pixel}*((\text{Max1}-\text{center})*(2^{10}-\text{center})+2^{10}*\text{center})/2^{10});$$

$$y_{sub31}=\Sigma\Sigma Tmp*\text{filter1}, \quad (14)$$

$k_{3\text{-}1pixel}$ represents a dimming coefficient, which may be set as required.

In the case that the second set of conditions is satisfied, the processing method is shown in Formula (15):

$$y_{sub32}=\text{floor}(k_{3\text{-}2pixel}*((\text{Max1}-\text{center})*(2^{10}-\text{center})+2^{10}*\text{center})/2^{10});$$

$$y_{sub31}=\Sigma\Sigma Tmp*\text{filter1}, \quad (15)$$

$k_{3\text{-}2pixel}$ represents a dimming coefficient, which may be set as required.

Then, the compensated fourth grayscale data sub4 is acquired based on sub4=max (ysub31,ysub32).

In the case that the single-pixel dark line, the double-pixel dark line, and the tri-pixel dark line are detected, it can be processed according to the following Formula (16):

$$y_{sub32}=\text{floor}(k_{black}*((\text{Max1}));$$

$$y_{sub31}=\Sigma\Sigma Tmp*\text{filter1}, \quad (16)$$

$k_{black}$ represents a dimming coefficient, which may be set as required.

In the case that a transverse single-pixel dark line is detected, it can be processed according to the following Formula (17):

$$y_{sub32}=\text{floor}(k_{black}*((\text{Max2});$$

$$y_{sub31}=\Sigma\Sigma Tmp*\text{filter1}, \qquad (17)$$

Max2=max (center, first on the top and first on the bottom) (17).

The first on the top and the first on the bottom are grayscales of two secondary pixels on the top and the bottom of the dark spot.

Then, the compensated fourth grayscale data sub4 is acquired based on Formula (18):

$$sub4=\max(y_{sub31},y_{sub32}), \qquad (18).$$

Furthermore, in the case that the dark line or the bright line is detected, the following processing may also be performed.

In the case that the grayscale center of the central secondary pixel is equal to the area maximum value Max, no filtering is performed, and the area maximum value Max is used to assign the value.

In the case that the grayscale center of the central secondary pixel is not equal to the area maximum value Max, a median of Tmp is calculated and assigned to ysub32 (ysub32=k_md*median), ysub31 is assigned to a filter value, and the maximum value sub4 of the three parameters is acquired (sub4=max(k_c*center,ysub31,ysub32)). The above k_md and k_c are weights, which may be set as required. For example, the secondary pixels are brightened as much as possible in the case that D is equal to 1, and in this case, k_md and kc are 1 by default; and the filter value may be taken in the case that D is equal to 4, and in this case, k_md and kc are 0 by default.

S209 and S210 may be referred to as dilation blurring. The problem of bright line color shift under different grayscale backgrounds is solved by bright line detection and compensation, and the problem of low local contrast of an image displayed on the 4K4K stacking-screen is improved by the combination of dark line detection and compensation, and filtering.

It should be noted that S205 to S210 are optional steps. In the embodiments of the present disclosure, the aforementioned third grayscale data, the fourth grayscale data, or the compensated fourth grayscale data may be taken as the grayscale data of the second panel.

After the above processing, the method may further include: outputting the grayscale data of the second panel.

Outputting the grayscale data of the second panel may include:

processing the grayscale data of the second panel based on values of Flag_r and Flag_c. By taking 4K4K as an example:

Flag_r is equal to 0, Flag_c is equal to 0: ysub_out is equal to sub4;

Flag_r is equal to 1: ysub_out is equal to sub4(2:2161,:), that is, ysub_out is data of sub4 from which the first row is deleted;

Flag_r is equal to 2: ysub_out is equal tosub4(2:2160,:), that is, ysub_out is data of sub4 from which the last row is deleted;

Flag_c is equal to 1: ysub_out is equal tosub4(:,2:3841), that is, ysub_out is data of sub4 from which the first column is deleted; and Flag_c is equal to 2: ysub_out is equal tosub4(:,1:3840), that is, ysub_out is data of sub4 from which the last column is deleted.

The above case is illustrated by taking 4K4K as an example. In 8K4K, the above processing may also be performed.

Output bit widths of the grayscale data of the second panel needs to be processed based on a value of Mode_s corresponding to the second panel:

in the case that Mode_s is equal to 0, "Fake 10 bit" is output. For example, lower 2 bits are rounded up (carried in the case of 10\11) to acquire upper 8 bits, and then shifted to the left by two bits (0 is compensated to two bits), and finally 0 is compensated to two bits, which may be used for an 8 bit device (based on 0 truncation), or for a 10 bit device; and in the case that Mode_s is equal to 1, true 10 bit is output, that is, the processed grayscale data of the second panel is output directly.

In S211, fifth grayscale data is acquired by determining weighted grayscale values of a set of the secondary pixels corresponding to the primary pixels based on the grayscale data of the second panel.

In calculating the grayscales of the primary pixels, due to the misalignment of less than one primary pixel, the secondary pixel actually corresponding to main(i,j) may be not sub5(i,j), but a weighted value of the pixel grayscales of sub5 and the surrounding sub4(i−1:i+1,j−1:j+1) within a 3*3 window range of sub5 in accordance with Formula (19):

$$sub5(i,j)=\Sigma\Sigma(sub4(i-1:i+1,j-1:j+1)*\text{filter\_wd}), \qquad (19).$$

filter_wd represents a 3*3 filter template. Nine configurable parameters (b11, b12, b13; b21, b22, b23; b31, b32, b33) may be assigned a value to each 8 bit according to the actual alignment.

In S212, the grayscale data of the first panel is determined based on the fifth grayscale data and the first image.

The luminance of the first image may be determined based on the grayscale value of the first panel and the grayscale value of the second panel.

S212 may include the following steps.

A compensation coefficient ymain is calculated based on Formula (20):

$$\left(\frac{ymain}{1023}\right)^{\gamma 2} = \text{floor}\left(\frac{\left(\frac{sub1}{1023}\right)^{\gamma 0}*2^{16}\cdot\frac{1}{sub5^{\gamma 1}}*2^{17}}{2^{22}}\right), \qquad (20);$$

γ0 is 2.2, γ1 is 1, and γ2 is 2.2. According to the formula, the luminance of the first image may be determined based on the grayscale value of the first panel and the grayscale value of the second panel.

Grayscale data ymain_out of the first panel is calculated in accordance with Formula (21):

$$ymain\_out(R,G,B)=\text{floor}(ymain*((1/sub1)*2^{19})*src1(R,G,B)/2^{17}), \qquad (21);$$

controlling an output bit width after determining the grayscale data of the first panel by:

processing based on a value of Mode_m corresponding to the first panel:

outputting true 12 bit in the case that Mode_s is equal to 0, that is, directly outputting the grayscale data ymain_out;

determining "fake 12 bit (an actual effective bit being 10 bit)" in the case that Mode_m is equal to 1; outputting lower 2 bits, acquiring higher 10 bits after rounding up, and left shifting by two bits; and in the case that Mode_m is equal to 2, determining "fake 12 bit (an actual effective bit being 8 bit)"; outputting lower 4 bits are output, acquiring higher 8 bits after rounding up, and left shifting by four bits.

FIG. 12 is a block diagram of an apparatus for determining grayscale data according to an embodiment of the present disclosure. The apparatus for determining grayscale data is applicable to a stacking-screen display device. The stacking-screen display device includes a first panel and a second panel that are stacked. The first panel includes primary pixels, the second panel includes secondary pixels, and an orthographic projection of a first edge, on a display face of the second panel, of the first panel is outside the display face of the second panel. Referring to FIG. 12, the apparatus includes an acquiring module 301, a calculating module 302, a replacing module 303, and a processing module 304.

The acquiring module 301 is configured to acquire a source image, wherein the source image includes a plurality of pixel points.

The calculating module 302 is configured to acquire pixel values of third pixel points by calculating weighted values of channel values of first pixel point and channel values of second pixel points of corresponding colors, wherein the first pixel point is the pixel point, which corresponds to the first edge, in the source image, and the second pixel points are pixel points, which are adjacent to the first pixel point, in the source image.

The replacing module 303 is configured to acquire a first image by replacing pixel values of the second pixel points in the source image with the pixel values of the third pixel points.

The processing module 304 is configured to determine grayscale data of the first panel and grayscale data of the second panel based on the first image, wherein the grayscale data of the first panel includes grayscale values of the primary pixels, and the grayscale data of the second panel includes grayscale values of secondary pixels.

Optionally, the calculating module 302 is configured to determine a weight of the first pixel point and weights of the second pixel points based on a misalignment size of screen stacking, wherein the greater the misalignment size of screen stacking, the less the weight of the first pixel point, and the greater the weights of the second pixel points; the misalignment size of screen stacking indicates a number of arrays of the primary pixels whose orthographic projections are outside the display face of the second panel, and an arrangement direction of the arrays of the primary pixels is parallel to the first edge of the first panel; and calculate the weighted values of the channel values of the first pixel point and the channel values of the second pixel points of the corresponding colors based on the weight of the first pixel point and the weights of the second pixel points.

Optionally, a number of arrays of the second pixel points is equal to a number of arrays of the third pixel points; and weights for calculating pixel values of the third pixel points in different arrays are different in the case that the number of arrays of the third pixel points is greater than 1.

Optionally, the processing module 304 is further configured to display a first pattern at a first position on the first panel; display a second pattern at a second position on the second panel, wherein the first position is at least partially opposite to the second position in the case that the first panel and the second panel are not misaligned; and determine the misalignment size of screen stacking of the first panel and the second panel based on luminance of the first pattern.

Optionally, the processing module 304 is configured to acquire first grayscale data of the second panel by extracting a maximum grayscale of three channels of the pixel points from the first image; acquire second grayscale data of the second panel by shifting the first grayscale data based on a misalignment size of screen stacking, wherein the greater the misalignment size of screen stacking, the more the shifting; the misalignment size of screen stacking indicates a number of arrays of the primary pixels whose orthographic projections are outside the display face of the second panel; and acquire third grayscale data of the second panel by calculating weighted values of the grayscale values of each of the secondary pixels and its surrounding secondary pixels based on the second grayscale data.

Optionally, the processing module 304 is configured to determine the first edge with the misalignment size of screen stacking greater than or equal to one array of primary pixels; and translate the first grayscale data along a direction toward the first edge, wherein the magnitude of the shifting is equal to an integer part of the misalignment size of screen stacking.

Optionally, the processing module 304 is configured to add at least one array of data bits ahead the first array of the first grayscale data; translate the first grayscale data along the direction toward the first edge, such that the at least one array of data bits is filled, and at least one array of data bits is vacated at the end of the first grayscale data; and fill the at least one array of data bits vacated at the end of the first grayscale data with at least one array at the end of the first grayscale data.

Optionally, the processing module 304 is configured to take the second grayscale data as grayscale data to be calculated in the case that resolutions of the first panel and the second panel are equal; and acquire the third grayscale data by calculating a weighted value of a grayscale mean value corresponding to the secondary pixels and a maximum grayscale value corresponding to the secondary pixels in the grayscale data to be calculated, wherein the grayscale mean value corresponding to the secondary pixels indicates a grayscale mean value of a plurality of first secondary pixels within a first range of the secondary pixels, and the maximum grayscale value corresponding to the secondary pixels indicates a maximum grayscale value of a plurality of second secondary pixels within a second range of the secondary pixels; wherein the first range and the second range are same or different; and at least one of the first secondary pixels is overlapped with the second secondary pixels, or none of the first secondary pixels is overlapped with the second secondary pixels.

Optionally, the processing module 304 is configured to acquire grayscale data to be calculated by calculating a weighted value of a grayscale mean value and a maximum value of the plurality of the primary pixels affected by the secondary pixels in the case that resolutions of the first panel and the second panel are different; and acquire the third grayscale data by calculating a weighted value of a grayscale mean value corresponding to the secondary pixels and a maximum grayscale value corresponding to the secondary pixels in the grayscale data to be calculated, wherein the grayscale mean value corresponding to the secondary pixels indicates a grayscale mean value of a plurality of first secondary pixels within a first range of the secondary pixels, and the maximum grayscale value corresponding to the secondary pixels indicates a maximum grayscale value of a plurality of second secondary pixels within a second range of the secondary pixels; wherein the first range and the second range are same or different; and at least one of the first secondary pixels is overlapped with the second secondary pixels, or none of the first secondary pixels is overlapped with the second secondary pixels.

Optionally, the processing module 304 is configured to filter the secondary pixels within the first range of the secondary pixels by a first filter, and select and calculate the grayscale mean value of the plurality of first secondary pixels; filter the secondary pixels within the second range of the secondary pixels by a second filter, and select and determine the maximum grayscale value of the plurality of second secondary pixels; and calculate the weighted value of the grayscale mean value of the plurality of first secondary pixels and the maximum grayscale value of the plurality of second secondary pixels.

Optionally, the first filter and the second filter have the size of 3*3.

Optionally, the processing module 304 is further configured to acquire a grayscale mapping table; and map the third grayscale data into fourth grayscale data by the grayscale mapping table, wherein grayscale values in the fourth grayscale data are not less than corresponding grayscale values in the third grayscale data in the case that resolutions of the first panel and the second panel are equal; and the grayscale values in the fourth grayscale data are not less than the corresponding grayscale values in the third grayscale data in the case that the resolutions of the first panel and the second panel are different, and the grayscale values are greater than a threshold.

Optionally, in the grayscale mapping table, the grayscale values in the third grayscale data are organized into a plurality of consecutive first ranges, and the grayscale values in the fourth grayscale data are organized into a plurality of consecutive second ranges that are in one-to-one correspondence with the plurality of first ranges. The processing module 304 is configured to determine the grayscale mapping table based on the resolutions of the first panel and the second panel; determine the first ranges of the grayscale values in the third grayscale data in the grayscale mapping table; determine the second ranges corresponding to the first ranges in the grayscale mapping table; and determine the grayscale values in the fourth grayscale data corresponding to the grayscale values in the third grayscale data by performing linear interpolation based on endpoints of the determined second ranges.

Optionally, the resolution of the first panel is 4K or 8K, and the resolution of the second panel is 4K; and the corresponding grayscale mapping tables are different in the case that the resolutions of the first panel are different.

Optionally, the processing module 304 is further configured to detect, based on the fourth grayscale data, whether the second panel includes an abnormal secondary pixel, wherein the abnormal secondary pixel is displayed as a bright line or a dark line; and acquire compensated fourth grayscale data by compensating the fourth grayscale data based on the grayscale values of secondary pixels on both sides of the abnormal secondary pixel in the case that the second panel includes the abnormal secondary pixel.

Optionally, the processing module 304 is configured to determine, based on grayscale values of a secondary pixel to be detected and its adjacent secondary pixels, whether the secondary pixel to be detected is displayed as a single-pixel bright line, a double-pixel bright line, or a tri-pixel bright line; and determine, based on the grayscale values of the secondary pixel to be detected and its adjacent secondary pixels, whether the secondary pixel to be detected is displayed as a single-pixel dark line, a double-pixel dark line, or a tri-pixel dark line.

Optionally, the processing module 304 is configured to acquire fifth grayscale data by determining weighted grayscale values of a set of the secondary pixels corresponding to the primary pixels based on the grayscale data of the second panel; and determine the grayscale data of the first panel based on the fifth grayscale data and the first image.

It should be noted that, when the apparatus for determining the grayscale data in the above embodiments performs a misalignment compensation of the stacking-screen, division of the above functional modules is merely used as an example. In actual applications, the foregoing functions can be achieved by different functional modules as required. That is, the internal structure of the apparatus is divided into different functional modules to achieve all or part of the functions described above. In addition, the apparatus for determining the grayscale date in the above embodiments and the method for determining the grayscale data in the above embodiments belong to the same concept, and the specific implementation process is detailed in the method embodiments, which are not repeated herein.

Figure 13:
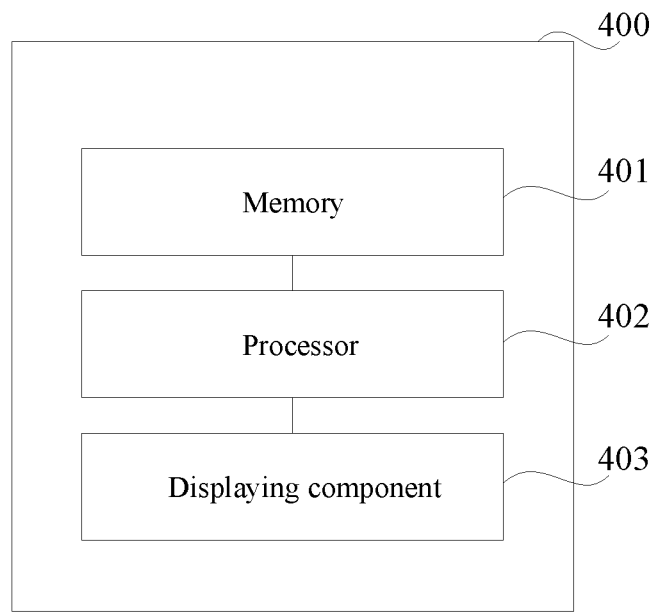
FIG. 13 is a block diagram of a computer device according to an embodiment of the present invention.

As shown in FIG. 13, an embodiment of the present disclosure further provides a computer device 400. The computer device 400 may be a stacking-screen display apparatus, or other computer devices with stacking-screens. The computer device 400 may be configured to perform the method for determining grayscale data in the above embodiments. Referring to FIG. 13, the computer device 400 includes a memory 401, a processor 402, and a display component 403. It should be understood for those skilled in the art that the structure of the computer device 400 shown in FIG. 13 does not constitute a limitation to the computer device 400, and may include more or less components than those illustrated, or combine some components or adopt different component arrangements in practical applications.

The memory 401 may be configured to store a computer program and a module, and mainly include a program storage region and a data storage area. A program storage region may store an operating system, an application required by at least one function, and the like. The memory 401 may include a high-speed random-access memory, and may further include a non-volatile memory, such as at least one magnetic disk storage device, a flash memory device, or other non-volatile solid-state storage devices. Correspondingly, the memory 401 may further include a memory controller configured to provide the processor 402 with access to the memory 401.

The processor 402 performs various functional applications and data processing by running software programs and modules stored in the memory 401.

The display component 403 is configured to display images. The display component 403 may include a display panel. Optionally, the display panel may be prepared in a form of a liquid crystal display (LCD), an organic light-emitting diode (OLED), and the like.

In an exemplary embodiment, a computer-readable storage medium is further provided, which is a non-transitory computer-readable storage medium. The computer-readable storage medium stores a computer program therein. The computer program in the computer-readable storage medium, when executed by a processor, causes the processor to perform the method for determining grayscale data according to the embodiments of the present disclosure.

In an exemplary embodiment, a computer program product is further provided. The computer program product stores instructions. The instructions, when executed by a computer, cause the computer to perform the method for determining grayscale data according to the embodiments of the present disclosure.

In an exemplary embodiment, a chip is further provided. The chip includes a programmable logic circuit and/or program instruction. The chip can perform the method for determining the grayscale data according to the embodiments of the present disclosure when running.

Figure 14:
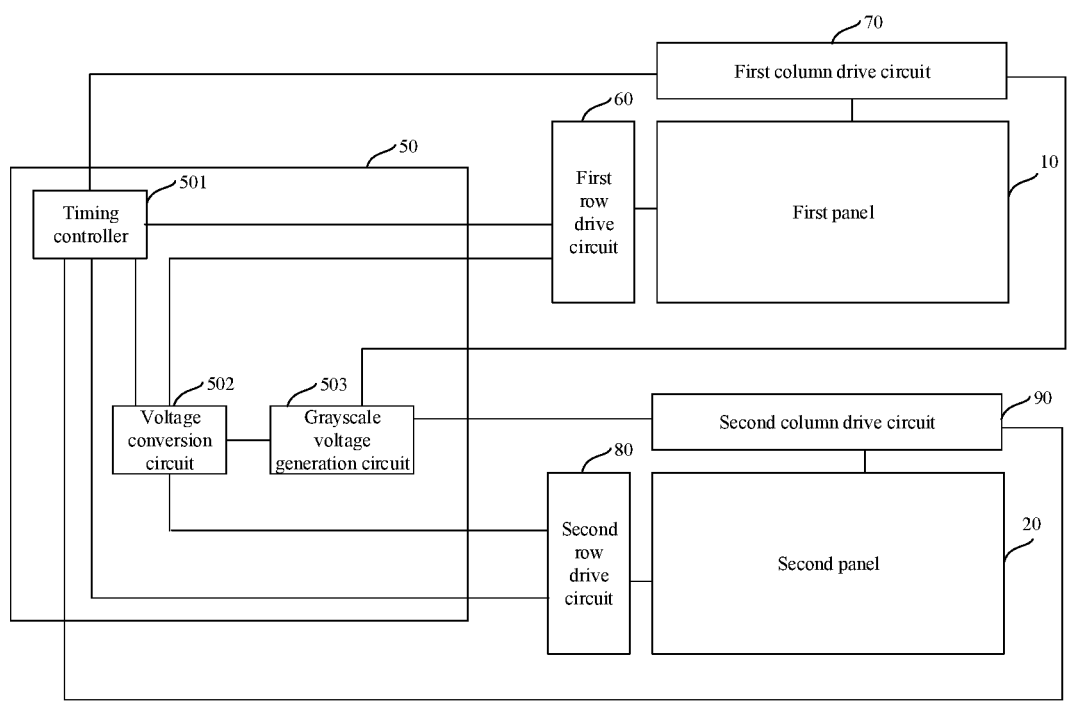
FIG. 14 is a schematic structural diagram of a screen drive board according to an embodiment of the present disclosure.

FIG. 14 is a schematic structural diagram of a screen drive board according to an embodiment of the present disclosure. Referring to FIG. 14, the screen drive board may also be referred to as a T-CON board 50, and includes: a timing controller (T-CON) 501, a voltage conversion (DC-DC) circuit 502, and a grayscale voltage generation (Gamma) circuit 503.

The timing controller 501 is configured to determine the grayscale data of the first panel 10 and the grayscale data of the second panel 20 based on a source image by the method shown in FIG. 2 or FIG. 4; and generate a timing control signal of the first panel 10 and a timing control signal of the second panel 20.

The voltage conversion circuit 502 is configured to generate a reference voltage signal (VDA) and a row drive signal based on a power supply.

The grayscale voltage generation circuit 503 is connected to the voltage conversion circuit 502, and configured to generate, based on the reference voltage signal, grayscale voltages required by grayscales of primary pixels of the first panel 10 and secondary pixels of the second panel 20.

The timing control signal of the first panel 10 and the row drive signal are supplied to a row drive circuit (or referred to as a gate drive circuit) of the first panel 10, i.e., a first row drive circuit 60 in FIG. 14. The timing control signal of the second panel and the row drive signal are supplied to a row drive circuit of the second panel 20, i.e., a second row drive circuit 70 in FIG. 14. The grayscale data of the first panel 10, the timing control signal of the first panel 10, and the grayscale voltages required by the grayscales of the primary pixels of the first panel 10 are supplied to a column drive circuit (or referred to as a source drive circuit) of the first panel 10, i.e., a first column drive circuit 80 in FIG. 14. The grayscale data of the second panel 20, the timing control signal of the second panel 20, and the grayscale voltages required by the grayscales of the secondary pixels of the second panel 20 are supplied to a column drive circuit of the second panel 20, i.e., a second column drive circuit 90 in FIG. 14.

Illustratively, the first row drive circuit 60 is connected to the timing controller 501, the voltage conversion circuit 502, and the first panel 10, and is configured to control switches of the rows of primary pixels of the first panel 10 based on the timing control signal of the first panel 10 by the row drive signal.

The first column drive circuit 70 is connected to the timing controller 501, the grayscale voltage generation circuit 503, and the first panel 10, and is configured to write, based on the grayscale data and the timing control signal of the first panel 10, a grayscale voltage supplied by the grayscale voltage generation circuit 503 into the columns of primary pixels of the first panel.

The second row drive circuit 80 is connected to the timing controller 501, the voltage conversion circuit 502, and the second panel 20, and is configured to control switches of the rows of secondary pixels of the second panel 20 based on the timing control signal of the second panel 20 by the row drive signal.

The second column drive circuit 90 is connected to the timing controller 501, the grayscale voltage generation circuit 503, and the second panel 20, and is configured to write, based on the grayscale data and the timing control signal of the second panel 20, a grayscale voltage supplied by the grayscale voltage generation circuit 503 to the columns of secondary pixels of the second panel 20.

In this implementation scheme, the driving control of the first panel 10 and the second panel 20 can be implemented simultaneously by one screen drive board.

The timing control signal includes a shift start pulse signal (STV) of a row drive circuit shift register, a trigger pulse signal (CKV) of the row drive circuit shift register, a shift start pulse signal (STH) of a column drive circuit shift register, a trigger pulse signal (CKH) of a source drive circuit shift register, and a polarity inversion control signal (POL). The row drive signal includes a gate high level signal (VGH) and a gate low level signal (VGL).

As shown in FIG. 14, the voltage conversion circuit 502 is further connected to the timing controller 501, and the voltage conversion circuit 502 may further generate a power supply voltage signal (VDD) and supply the power supply voltage signal to the timing controller 501.

The power supply voltage signal may be further supplied to the aforementioned first column drive circuit 70 and second column drive circuit 90.

Illustratively, a power supply input by the voltage conversion circuit 502 is usually a 12V or 5V power supply.

It may be understood by a person of ordinary skill in the art that all or part of steps in the above embodiments may be performed by hardware, or by relevant hardware instructed by a program. The program may be stored in a computer-readable storage medium which includes a read-only memory, a magnetic disk, an optical disc, or the like.

Described above are example embodiments of the present disclosure, and are not intended to limit the present disclosure. Any modifications, equivalent replacements, improvements and the like made within the spirit and principles of the present disclosure should be included within the scope of protection of the present disclosure.

What is claimed is:

1. A method for determining grayscale data, applicable to a stacking-screen display device, wherein the stacking-screen display device comprises a first panel and a second panel that are stacked, the first panel comprising primary pixels, the second panel comprising secondary pixels, and an orthographic projection of a first edge, on a plane of a display face of the second panel, of the first panel is outside the display face of the second panel;

the method comprising:
  acquiring a source image, wherein the source image comprises a plurality of pixel points;
  acquiring pixel values of third pixel points by calculating weighted values of channel values of a first pixel point and channel values of second pixel points of corresponding colors, wherein the first pixel point is a pixel point, which corresponds to the first edge, in the source image, and the second pixel points are pixel points, which are adjacent to the first pixel point, in the source image;
  acquiring a first image by replacing pixel values of the second pixel points in the source image with the pixel values of the third pixel points; and determining grayscale data of the first panel and grayscale data of the second panel based on the first image, wherein the grayscale data of the first panel comprises grayscale values of the primary pixels, and the grayscale data of the second panel comprises grayscale values of the secondary pixels, wherein determining the grayscale data of the second panel based on the first image comprises:

acquiring first grayscale data of the second panel by extracting a maximum grayscale of three channels of the pixel points from the first image;

acquiring second grayscale data of the second panel by shifting the first grayscale data based on a misalignment size of screen stacking, wherein the greater the misalignment size of screen stacking, the more the shifting, and the misalignment size of screen stacking indicates a number of arrays of the primary pixels whose orthographic projections are outside the display face of the second panel; and acquiring third grayscale data of the second panel by calculating a weighted value of the grayscale values of each of the secondary pixels and its surrounding secondary pixels based on the second grayscale data, wherein acquiring the second grayscale data of the second panel by shifting the first grayscale data based on the misalignment size of screen stacking comprises:

determining the first edge with the misalignment size of screen stacking greater than or equal to one array of primary pixels; and translating the first grayscale data along a direction toward the first edge, wherein the magnitude of the shifting is equal to an integer part of the misalignment size of screen stacking, wherein translating the first grayscale data along the direction toward the first edge comprises:

adding at least one array of data bits ahead a first array of the first grayscale data:

translating the first grayscale data along the direction toward the first edge, such that the at least one array of data bits is filled, and at least one array of data bits is vacated at the end of the first grayscale data; and filling the at least one array of data bits vacated at the end of the first grayscale data with at least one array of data at the end of the first grayscale data.

2. The method according to claim 1, wherein calculating the weighted values of the channel values of the first pixel point and the channel values of the second pixel points of the corresponding colors comprises:

determining a weight of the first pixel point and weights of the second pixel points based on a misalignment size of screen stacking, wherein the greater the misalignment size of screen stacking, the less the weight of the first pixel point, and the greater the weights of the second pixel points, the misalignment size of screen stacking indicates a number of arrays of the primary pixels whose orthographic projections are outside the display face of the second panel, and an arrangement direction of the arrays of the primary pixels is parallel to the first edge of the first panel; and calculating the weighted values of the channel values of the first pixel point and the channel values of the second pixel points of the corresponding colors based on the weight of the first pixel point and the weights of the second pixel points.

3. The method according to claim 2, wherein a number of arrays of the second pixel points is equal to a number of arrays of the third pixel points; and weights for calculating pixel values of the third pixel points in different arrays are different in the case that the number of arrays of the third pixel points is greater than 1.

4. The method according to claim 2, further comprising:

displaying a first pattern at a first position on the first panel;

displaying a second pattern at a second position on the second panel, wherein the first position is at least partially opposite to the second position in the case that the first panel and the second panel are not misaligned; and determining the misalignment size of screen stacking of the first panel and the second panel based on luminance of the first pattern.

5. The method according to claim 1, wherein resolutions of the first panel and the second panel are equal; and acquiring the third grayscale data of the second panel by calculating the weighted value of the grayscale values of each of the secondary pixels and its surrounding secondary pixels based on the second grayscale data comprises:

determining the second grayscale data as grayscale data to be calculated; and acquiring the third grayscale data by calculating a weighted value of a grayscale mean value corresponding to the secondary pixels and a maximum grayscale value corresponding to the secondary pixels in the grayscale data to be calculated, wherein the grayscale mean value corresponding to the secondary pixels indicates a grayscale mean value of a plurality of first secondary pixels within a first range of the secondary pixels, and the maximum grayscale value corresponding to the second secondary pixels indicates a maximum grayscale value of a plurality of second secondary pixels within a second range of the secondary pixels; wherein the first range and the second range are same or different; and at least one of the first secondary pixels is overlapped with the second secondary pixels, or none of the first secondary pixels is overlapped with the second secondary pixels.

6. The method according to claim 1, wherein resolutions of the first panel and the second panel are not equal; and acquiring the third grayscale data of the second panel by calculating the weighted value of the grayscale values of each of the secondary pixels and its surrounding secondary pixels based on the second grayscale data comprises:

acquiring grayscale data to be calculated by calculating a weighted value of a grayscale mean value and a maximum value of the plurality of the primary pixels affected by the secondary pixels; and acquiring the third grayscale data by calculating a weighted value of a grayscale mean value corresponding to the secondary pixels and a maximum grayscale value corresponding to the secondary pixels in the grayscale data to be calculated, wherein the grayscale mean value corresponding to the secondary pixels indicates a grayscale mean value of a plurality of first secondary pixels within a first range of the secondary pixels, and the maximum grayscale value corresponding to the secondary pixels indicates a maximum grayscale value of a plurality of second secondary pixels within a second range of the secondary pixels; wherein the first range and the second range are same or different; and at least one of the first secondary pixels is overlapped with the second secondary pixels, or none of the first secondary pixels is overlapped with the second secondary pixels.

7. The method according to claim 5, wherein calculating the weighted value of the grayscale mean value corresponding to the secondary pixels and the maximum grayscale value corresponding to the secondary pixels in the grayscale data to be calculated comprises:
filtering the secondary pixels within the first range of the secondary pixels by a first filter, and selecting and calculating the grayscale mean value of the plurality of first secondary pixels;
filtering the secondary pixels within the second range of the secondary pixels by a second filter, and selecting and determining the maximum grayscale value of the plurality of second secondary pixels; and
calculating the weighted value of the grayscale mean value of the plurality of first secondary pixels and the maximum grayscale value of the plurality of second secondary pixels.

8. The method according to claim 7, wherein both the first filter and the second filter have a size of 3*3.

9. The method according to claim 1, wherein determining the grayscale data of the second panel based on the first image further comprises:
acquiring a grayscale mapping table; and
mapping the third grayscale data into fourth grayscale data by the grayscale mapping table;
wherein grayscale values in the fourth grayscale data are not less than corresponding grayscale values in the third grayscale data in the case that resolutions of the first panel and the second panel are equal; and the grayscale values in the fourth grayscale data are not less than the corresponding grayscale values in the third grayscale data in the case that the resolutions of the first panel and the second panel are not equal, and the grayscale values are greater than a threshold.

10. The method according to claim 9, wherein
in the grayscale mapping table, the grayscale values in the third grayscale data are organized into a plurality of consecutive first ranges, and the grayscale values in the fourth grayscale data are organized into a plurality of consecutive second ranges that are in one-to-one correspondence with the plurality of first ranges; and
mapping the third grayscale data into the fourth grayscale data by the grayscale mapping table comprises:
determining the grayscale mapping table based on the resolutions of the first panel and the second panel;
determining the first ranges of the grayscale values in the third grayscale data in the grayscale mapping table;
determining the second ranges corresponding to the first ranges in the grayscale mapping table; and
determining the grayscale values in the fourth grayscale data corresponding to the grayscale values in the third grayscale data by performing linear interpolation based on endpoints of the determined second ranges.

11. The method according to claim 10, wherein the resolution of the first panel is 4K or 8K, and the resolution of the second panel is 4K; and
the corresponding grayscale mapping tables are different in the case that the first panel has different resolutions.

12. The method according to claim 9, wherein determining the grayscale data of the second panel based on the first image further comprises:
detecting, based on the fourth grayscale data, whether the second panel comprises an abnormal secondary pixel, wherein the abnormal secondary pixel is displayed as a bright line or a dark line; and
acquiring compensated fourth grayscale data by compensating the fourth grayscale data based on the grayscale values of secondary pixels on both sides of the abnormal secondary pixel in the case that the second panel comprises the abnormal secondary pixel.

13. The method according to claim 12, wherein detecting, based on the fourth grayscale data, whether the second panel comprises the abnormal secondary pixel comprises:
determining, based on grayscale values of a secondary pixel to be detected and its adjacent secondary pixels, whether the secondary pixel to be detected is displayed as a single-pixel bright line, a double-pixel bright line, or a tri-pixel bright line; and
determining, based on the grayscale values of the secondary pixel to be detected and its adjacent secondary pixels, whether the secondary pixel to be detected is displayed as a single-pixel dark line, a double-pixel dark line, or a tri-pixel dark line.

14. The method according to claim 1, wherein determining the grayscale data of the first panel based on the first image comprises:
acquiring fifth grayscale data by determining weighted grayscale values of a set of the secondary pixels corresponding to the primary pixels based on the grayscale data of the second panel; and
determining the grayscale data of the first panel based on the fifth grayscale data and the first image.

15. A computer device, comprising: a processor and a memory; wherein
the memory is configured to store a computer program; and
the processor, when running the computer program stored in the memory, is caused to perform a method for determining grayscale data, applicable to a stacking-screen display device, wherein the stacking-screen display device comprises a first panel and a second panel that are stacked, the first panel comprising primary pixels, the second panel comprising secondary pixels, and an orthographic projection of a first edge, on a plane of a display face of the second panel, of the first panel is outside the display face of the second panel;
the method comprising:
acquiring a source image, wherein the source image comprises a plurality of pixel points;
acquiring pixel values of third pixel points by calculating weighted values of channel values of a first pixel point and channel values of second pixel points of corresponding colors, wherein the first pixel point is a pixel point, which corresponds to the first edge, in the source image, and the second pixel points are pixel points, which are adjacent to the first pixel point, in the source image;
acquiring a first image by replacing pixel values of the second pixel points in the source image with the pixel values of the third pixel points; and
determining grayscale data of the first panel and grayscale data of the second panel based on the first image, wherein the grayscale data of the first panel comprises grayscale values of the primary pixels, and the grayscale data of the second panel comprises grayscale values of the secondary pixels,
wherein determining the grayscale data of the second panel based on the first image comprises:

acquiring first grayscale data of the second panel by extracting a maximum grayscale of three channels of the pixel points from the first image;

acquiring second grayscale data of the second panel by shifting the first grayscale data based on a misalignment size of screen stacking, wherein the greater the misalignment size of screen stacking, the more the shifting, and the misalignment size of screen stacking indicates a number of arrays of the primary pixels whose orthographic projections are outside the display face of the second panel; and acquiring third grayscale data of the second panel by calculating a weighted value of the grayscale values of each of the secondary pixels and its surrounding secondary pixels based on the second grayscale data, wherein acquiring the second grayscale data of the second panel by shifting the first grayscale data based on the misalignment size of screen stacking comprises:

determining the first edge with the misalignment size of screen stacking greater than or equal to one array of primary pixels; and translating the first grayscale data along a direction toward the first edge, wherein the magnitude of the shifting is equal to an integer part of the misalignment size of screen stacking, wherein translating the first grayscale data along the direction toward the first edge comprises:

adding at least one array of data bits ahead a first array of the first grayscale data;

translating the first grayscale data along the direction toward the first edge, such that the at least one array of data bits is filled, and at least one array of data bits is vacated at the end of the first grayscale data; and filling the at least one array of data bits vacated at the end of the first grayscale data with at least one array of data at the end of the first grayscale data.

16. A non-transitory computer-readable storage medium, storing one or more computer instructions therein, wherein the one or more computer instructions, when executed by a processor, cause the processor to perform a method for determining grayscale data, applicable to a stacking-screen display device, wherein the stacking-screen display device comprises a first panel and a second panel that are stacked, the first panel comprising primary pixels, the second panel comprising secondary pixels, and an orthographic projection of a first edge, on a plane of a display face of the second panel, of the first panel is outside the display face of the second panel;

the method comprising:

acquiring a source image, wherein the source image comprises a plurality of pixel points;

acquiring pixel values of third pixel points by calculating weighted values of channel values of a first pixel point and channel values of second pixel points of corresponding colors, wherein the first pixel point is a pixel point, which corresponds to the first edge, in the source image, and the second pixel points are pixel points, which are adjacent to the first pixel point, in the source image;

acquiring a first image by replacing pixel values of the second pixel points in the source image with the pixel values of the third pixel points; and determining grayscale data of the first panel and grayscale data of the second panel based on the first image, wherein the grayscale data of the first panel comprises grayscale values of the primary pixels, and the grayscale data of the second panel comprises grayscale values of the secondary pixels, wherein determining the grayscale data of the second panel based on the first image comprises:

acquiring first grayscale data of the second panel by extracting a maximum grayscale of three channels of the pixel points from the first image;

acquiring second grayscale data of the second panel by shifting the first grayscale data based on a misalignment size of screen stacking, wherein the greater the misalignment size of screen stacking, the more the shifting, and the misalignment size of screen stacking indicates a number of arrays of the primary pixels whose orthographic projections are outside the display face of the second panel; and acquiring third grayscale data of the second panel by calculating a weighted value of the grayscale values of each of the secondary pixels and its surrounding secondary pixels based on the second grayscale data, wherein acquiring the second grayscale data of the second panel by shifting the first grayscale data based on the misalignment size of screen stacking comprises:

determining the first edge with the misalignment size of screen stacking greater than or equal to one array of primary pixels; and translating the first grayscale data along a direction toward the first edge, wherein the magnitude of the shifting is equal to an integer part of the misalignment size of screen stacking, wherein translating the first grayscale data along the direction toward the first edge comprises:

adding at least one array of data bits ahead a first array of the first grayscale data;

translating the first grayscale data along the direction toward the first edge, such that the at least one array of data bits is filled, and at least one array of data bits is vacated at the end of the first grayscale data; and filling the at least one array of data bits vacated at the end of the first grayscale data with at least one array of data at the end of the first grayscale data.

17. A screen drive board, comprising:

a timing controller, configured to determine the grayscale data of the first panel and the grayscale data of the second panel based on a source image by the method as defined in claim 1, and generate a timing control signal of the first panel and a timing control signal of the second panel;

a voltage conversion circuit, configured to generate a reference voltage signal and a row drive signal based on a power supply; and a grayscale voltage generation circuit, connected to the voltage conversion circuit, and configured to generate, based on the reference voltage signal, grayscale voltages required by grayscales of primary pixels of the first panel and secondary pixels of the second panel;

wherein the timing control signal of the first panel and the row drive signal are supplied to a row drive circuit of the first panel, and the timing control signal of the second panel and the row drive signal are supplied to a row drive circuit of the second panel; the grayscale data of the first panel, the timing control signal of the first panel, and the grayscale voltages required by the grayscales of the primary pixels of the first panel are supplied to a column drive circuit of the first panel; and the grayscale data of the second panel, the timing control signal of the second panel, and the grayscale voltages required by the grayscales of the secondary pixels of the second panel are supplied to a column drive circuit of the second panel.

\* \* \* \* \*